US012625558B2

(12) United States Patent
Kim

(10) Patent No.: US 12,625,558 B2
(45) Date of Patent: May 12, 2026

(54) METHOD AND APPARATUS FOR USER-DEFINED GESTURE PROFILE GENERATION AND GESTURE RECOGNITION, BASED ON REPEATED MOTION OF USER

(71) Applicants: COX SPACE CO., LTD, Seongnam-si (KR); Ho Yeon Kim, Suwon-si (KR)

(72) Inventor: Ho Yeon Kim, Suwon-si (KR)

(73) Assignees: COX SPACE CO., LTD, Seongnam-si (KR); Ho Yeon Kim, Suwon-si (KR)

(*) Notice: Subject to any disclaimer, the term of this patent is extended or adjusted under 35 U.S.C. 154(b) by 264 days.

(21) Appl. No.: 18/690,659

(22) PCT Filed: Nov. 8, 2021

(86) PCT No.: PCT/KR2021/016095
§ 371 (c)(1),
(2) Date: Mar. 8, 2024

(87) PCT Pub. No.: WO2023/038195
PCT Pub. Date: Mar. 16, 2023

(65) Prior Publication Data
US 2025/0190057 A1      Jun. 12, 2025

(30) Foreign Application Priority Data

Sep. 12, 2021     (KR) ........................ 10-2021-0121363

(51) Int. Cl.
G06F 3/0346      (2013.01)
G06F 3/01      (2006.01)
(52) U.S. Cl.
CPC .............. G06F 3/017 (2013.01); G06F 3/014 (2013.01); G06F 3/0346 (2013.01)

(58) Field of Classification Search
CPC ......... G06F 3/017; G06F 3/014; G06F 3/0346
See application file for complete search history.

(56) References Cited

U.S. PATENT DOCUMENTS

| | | | | | |
|---|---|---|---|---|---|
| 8,289,162 | B2* | 10/2012 | Mooring | ................. | G06F 3/017 |
| | | | | | 340/407.1 |
| 2016/0048161 | A1* | 2/2016 | Carceroni | ............. | G06F 1/3206 |
| | | | | | 361/679.03 |
| 2021/0103339 | A1* | 4/2021 | Isgar | ..................... | G06F 3/0346 |
| 2021/0117010 | A1* | 4/2021 | Rizzardini | ............ | G06F 1/3265 |

OTHER PUBLICATIONS

Chenning Li et al., WiHF: Gesture and User Recognition With WiFi, Jul. 15, 2020, IEEE Transactions on Mobile Computing, vol. 21, No. 2, pp. 757-768 (Year: 2020).*
Alexandros Preventis et al., Personalized Motion Sensor Driven Gesture Recognition in the FIWARE Cloud Platform, Jun. 1, 2015, International Symposium on Parallel and Distributed Computing, pp. 19-26 (Year: 2015).*

* cited by examiner

*Primary Examiner* — Tam T Tran
(74) *Attorney, Agent, or Firm* — Sughrue Mion, PLLC

(57)      ABSTRACT

A method by which an electronic device outputs a control signal based on a motion of a user may comprise the steps of: when an operation mode of the electronic device is a gesture recording mode, generating a gesture profile of the user corresponding to a reference motion as the user performs a recording motion of mimicking the reference motion at least once; and when the operation mode is a gesture recognition mode, determining whether a recognition motion of the user matches the reference motion.

13 Claims, 15 Drawing Sheets front surface

FIG.6
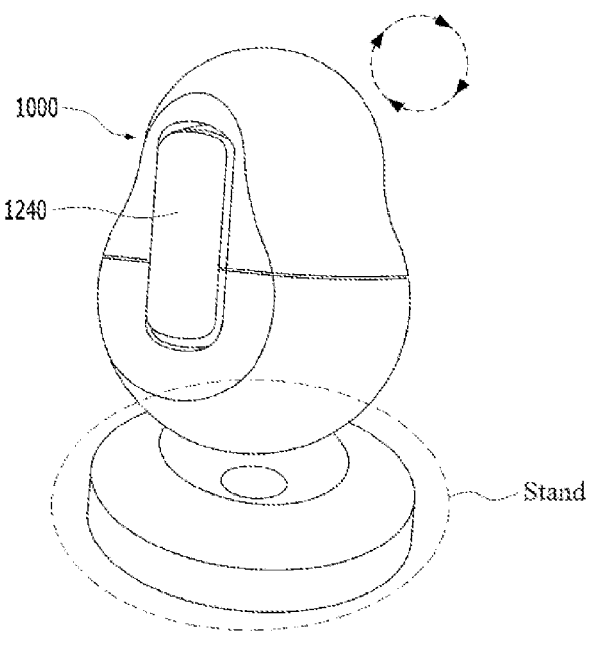
FIG.7
Left
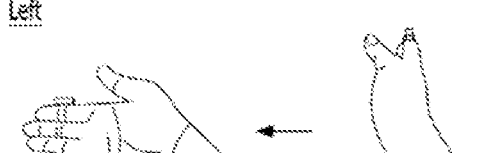
Up
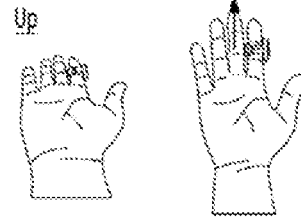
Right
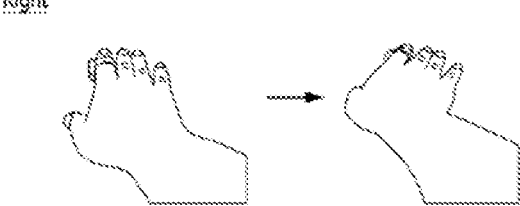
Down
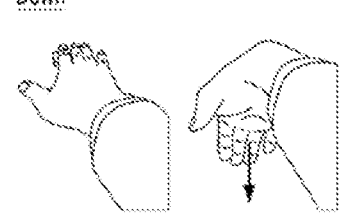
Clockwise/Counter Clockwise Rotation
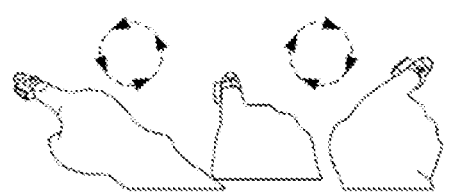
Forward/Back
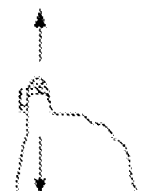

L, R, U, D, FF, BW, CC, ACC

Host Device

FIG. 14

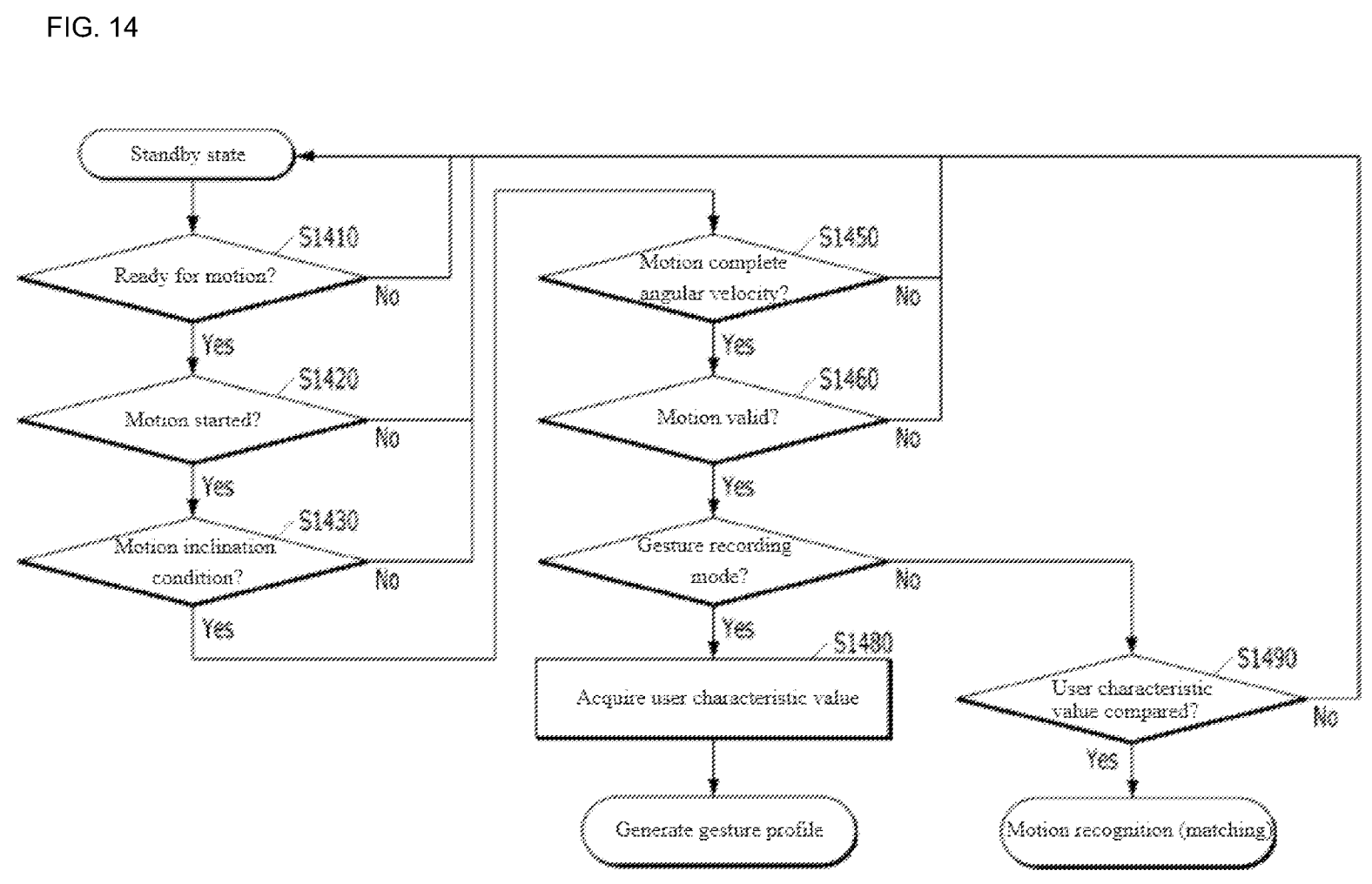

Standby state

S1410 — Ready for motion? — No / Yes

S1420 — Motion started? — No / Yes

S1430 — Motion inclination condition? — No / Yes

S1450 — Motion complete angular velocity? — No / Yes

S1460 — Motion valid? — No / Yes

S1470 — Gesture recording mode? — No / Yes

S1480 — Acquire user characteristic value

Generate gesture profile

S1490 — User characteristic value compared? — No / Yes

Motion recognition (matching)

FIG. 17

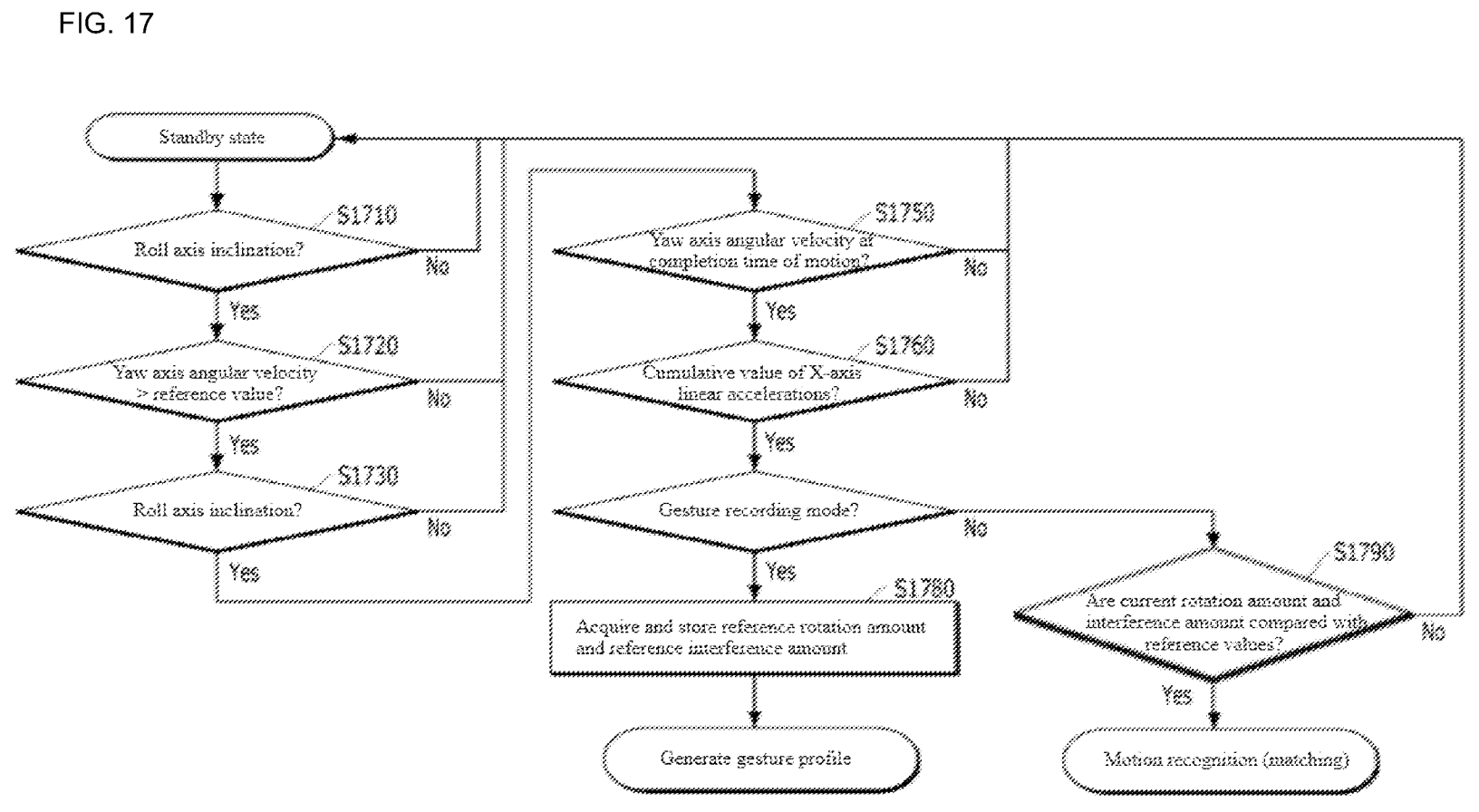

Standby state

S1710 Roll axis inclination?
Yes

S1720 Yaw axis angular velocity > reference value?
Yes

S1730 Roll axis inclination?
Yes

No

No

No

S1750 Yaw axis angular velocity at completion time of motion?
Yes

S1760 Cumulative value of X-axis linear accelerations?
Yes

S1770 Gesture recording mode?
Yes

No

No

No

Acquire and store reference rotation amount and reference interference amount

Generate gesture profile

S1780 Are current rotation amount and interference amount compared with reference values?
No Yes Motion recognition (matching)

METHOD AND APPARATUS FOR USER-DEFINED GESTURE PROFILE GENERATION AND GESTURE RECOGNITION, BASED ON REPEATED MOTION OF USER

CROSS REFERENCE TO RELATED APPLICATIONS

This is a National Stage Application of International Application No. PCT/KR2021/016095 filed Nov. 8, 2021, claiming priority based on Korean Patent Application No. 10-2021-0121363 filed Sep. 12, 2021.

TECHNICAL FIELD

The present disclosure relates to a gesture recognition method performed in an electronic device.

BACKGROUND ART

Gesture or motion recognition technology is continuously developing thanks to the growth of wearable devices and the development of the virtual reality-based content market such as computer graphics technology, augmented reality (AR), virtual reality (VR), and mixed reality (MR). However, gesture recognition technology is mainly used to create virtual content in games or content based on computer graphics in movie production companies rather than to control devices, so the gesture recognition technology has very limited use in everyday life.

For these reasons, there is a problem in that firstly, it is difficult to use in fields where errors in gesture recognition technology may cause fatal results, and secondly, for gesture recognition, a method of acquiring an image of an object from a camera to recognize a gesture based on image processing is widely used, but the image processing method is greatly influenced by the environment, and thus recognition errors are frequent and the algorithm needs to be very sophisticated. Thirdly, the accuracy of gesture recognition may be increased by having the user attach a landmark or wear a special gear, but this method is too cumbersome and inconvenient for the user, which is why gesture recognition is not used in daily life or daily work.

In addition, there are conventional technologies that acquire motion data through a motion sensor and perform gesture recognition based thereon, but most of them are technologies that recognize gestures by using only one or two types of data, such as acceleration data, and processing them. In recent years, a 9-axis sensor including an accelerometer, a gyroscope, and a magnetometer has been widely and inexpensively distributed, but there is no technology to increase the gesture recognition rate by mounting it on a wearable device and recognizing gestures based on the acquired sensor data or generating a gesture profile specialized for a specific user.

DISCLOSURE OF INVENTION

Technical Problem

A method for generating a gesture profile specialized for a user based on motion data acquired by a user's motion on a three-dimensional space, and recognizing the current user's motion as a specific gesture based on the generated gesture profile may be provided.

A technical task to be achieved by the present embodiment may not be limited to the above-described technical task, and other technical tasks may be inferred from the following embodiments.

Technical Solution

A method for generating a gesture profile specialized for a user based on motion data acquired by a user's motion on a three-dimensional space, and recognizing the current user's motion as a specific gesture based on the generated gesture profile may be provided.

A technical task to be achieved by the present embodiment may not be limited to the above-described technical task, and other technical tasks may be inferred from the following embodiments.

Advantageous Effects

A method for generating a gesture profile specialized for a user through acquiring motion data on a three-dimensional space, and recognizing a user's specific gesture based on the generated gesture profile may be provided.

As the user directly makes a reference motion, a user characteristic value for a specific reference motion may be stored and gesture recognition is performed based thereon, thereby improving the accuracy of gesture recognition and easily and precisely controlling various content on a smartphone, a TV, a computer, a tablet PC, a hologram, and a head mount display (HMD).

BRIEF DESCRIPTION OF THE DRAWINGS

FIG. 6 shows a joystick using an electronic device, according to one embodiment.

FIG. 7 shows reference motions for controlling a host device with an electronic device under a gesture mode, according to one embodiment.

FIG. 14 shows a flowchart of a method performed in a gesture recording mode or gesture recognition mode for a left, right, up, or down move (L/R/U/D) motion, according to one embodiment.

FIG. 17 shows a flowchart of a method performed in a gesture recording mode or gesture recognition mode for an up move motion, according to one embodiment.

BEST MODE FOR CARRYING OUT THE INVENTION

Figure 1A:
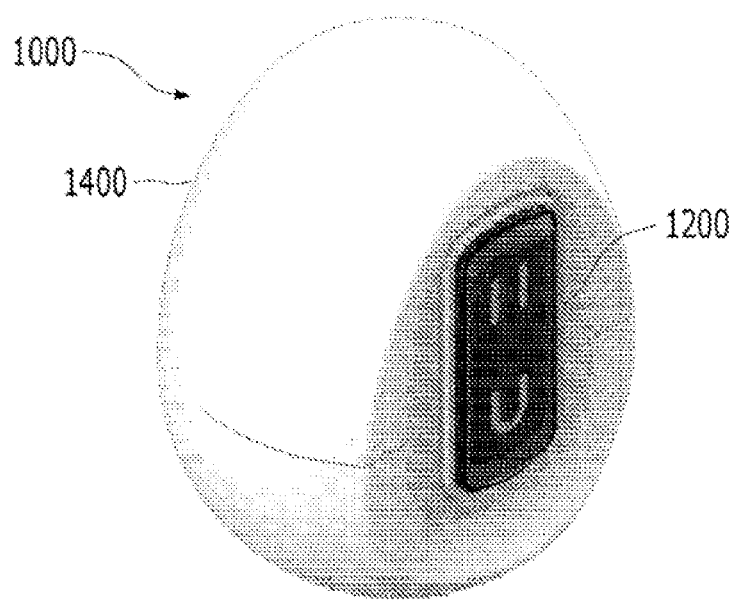
FIG. 1A shows an electronic device (in a closed state) for controlling a host device, according to one embodiment.

A method for outputting a control signal based on a user's left move motion in an electronic device may include acquiring acceleration values for an X-axis in a left-right direction, a Y-axis in an up-down direction, and a Z-axis in a front-rear direction, respectively, based on acceleration data received from an accelerometer of the electronic device, acquiring angular velocity values for a yaw axis, a pitch axis, and a roll axis, respectively, based on gyro data received from a gyroscope of the electronic device, acquiring inclination values for a yaw axis, a pitch axis, and a roll axis, respectively, based on acceleration data, gyro data, and geomagnetic data acquired from the accelerometer, the gyroscope, and the magnetometer of the electronic device, respectively, generating, when a current operation mode is a gesture recording mode, the user' gesture profile corresponding to a reference motion by making a recording motion in which the user makes the reference motion at least once, and determining, when the current operation mode is a gesture recognition mode, whether the user's recognition motion matches the reference motion, wherein the reference motion is a left move, and the generating of the user's gesture profile includes a first step of determining, when an inclination with respect to the pitch axis of the electronic device is within a first reference range and an inclination with respect to the roll axis is within a second reference range, that the recording motion is ready, a second step of determining, when the recording motion is ready, that the recording motion has started when an angular velocity with respect to the yaw axis is above a first reference value, a third step of ending, when the recording motion is started, the generation of the gesture profile and returning to a standby state when the inclination with respect to the roll axis of the recording motion is out of a third reference range or the inclination with respect to the pitch axis is out of a fourth reference range, a fourth step of ending, when an angular velocity with respect to the yaw axis at a completion time of the recording motion is below a second reference value, the generation of the gesture profile and returning to the standby state, a fifth step of determining, when a cumulative value of linear acceleration velocity with respect to the X-axis from a start time to a completion time of the recording motion is below a third reference value, that the recording motion is invalid to end the generation of the gesture profile to return to the standby mode, and a sixth step of storing a reference rotation amount, which is a value obtained by dividing a maximum angular velocity with respect to the roll axis from the start time to the completion time of the recording motion by a maximum angular velocity with respect to the yaw axis, and a reference interference amount, which is a value obtained by dividing a maximum angular velocity with respect to the pitch axis from the start time to the completion time of the recording motion by a maximum angular velocity with respect to the yaw axis, in a memory as the user's characteristic values, and the completion time of the recording motion is determined as a time when a current angular velocity value with respect to the yaw axis becomes below a reference ratio of the maximum angular velocity with respect to the yaw axis after the start time of the recording motion.

The user's gesture profile may be generated by the user making the recording motion a number of times, each number may be counted only when all operations from the first step to the sixth step are completed, the reference rotation amount may be determined based on reference rotation amounts acquired over a number of times, respectively, and the reference interference amount may be determined based on reference interference amounts acquired over a number of times, respectively.

The determining of whether the user's recognition motion matches the reference motion may include a seventh step of determining, when an inclination with respect to the pitch axis of the electronic device is within the first reference range and an inclination with respect to the roll axis is within the second reference range, that the recognition motion is ready, an eighth step of determining, when the recognition motion is ready, that the recognition motion has started when an angular velocity with respect to the yaw axis is above the first reference value, a ninth step of ending, when the recognition motion is started, recognition and returning to a standby state when the inclination with respect to the roll axis of the recording motion is out of the third reference range or the inclination with respect to the pitch axis is out of the fourth reference range, a tenth step of ending, when an angular velocity with respect to the yaw axis at a completion time of the recognition motion is below the second reference value, recognition and returning to the standby state, an eleventh step of determining, when a cumulative value of linear acceleration velocity with respect to the X-axis from a start time to a completion time of the recognition motion is below the third reference value, that the recognition motion is invalid to end recognition to return to the standby mode, and a twelfth step of comparing a current rotation amount, which is a value obtained by dividing a maximum angular velocity with respect to the roll axis from the start time to the completion time of the recognition motion by a maximum angular velocity with respect to the yaw axis, and a current interference amount, which is a value obtained by dividing a maximum angular velocity with respect to the pitch axis from the start time to the completion time of the recognition motion by a maximum angular velocity with respect to the yaw axis, with the reference rotation amount and the reference interference amount previously stored in the memory, respectively, wherein whether the recognition motion matches the reference motion is determined based on the comparison result, and the completion time of the recognition motion is determined as a time when a current angular velocity value with respect to the yaw axis becomes below a reference ratio of the maximum angular velocity with respect to the yaw axis after the start time of the recognition motion.

A method for outputting a control signal based on a user's right move motion in an electronic device may include acquiring acceleration values for an X-axis in a left-right direction, a Y-axis in an up-down direction, and a Z-axis in a front-rear direction, respectively, based on acceleration data received from an accelerometer of the electronic device, acquiring angular velocity values for a yaw axis, a pitch axis, and a roll axis, respectively, based on gyro data received from a gyroscope of the electronic device, acquiring inclination values for a yaw axis, a pitch axis, and a roll axis, respectively, based on acceleration data, gyro data, and geomagnetic data acquired from the accelerometer, the gyroscope, and the magnetometer of the electronic device, respectively, generating, when a current operation mode is a gesture recording mode, the user' gesture profile corresponding to a reference motion by making a recording motion in which the user makes the reference motion at least once, and determining, when the current operation mode is a gesture recognition mode, whether the user's recognition motion matches the reference motion, wherein the reference motion is a right move, and the generating of the user's gesture profile includes a first step of determining, when an inclination value with respect to the roll axis of the electronic device is within a first reference range, that the recording motion is ready, a second step of determining, when the recording motion is ready, that the recording motion has started when an angular velocity with respect to the pitch axis is above a first reference value, a third step of ending, when the recording motion is started, the generation of the gesture profile and returning to a standby state when the inclination with respect to the roll axis of the recording motion is out of a second reference range, a fourth step of ending, when an angular velocity with respect to the pitch axis at a completion time of the recording motion is below a second reference value, the generation of the gesture profile and returning to the standby state, a fifth step of determining, when a cumulative value of linear acceleration velocity with respect to the Z-axis from a start time to a completion time of the recording motion is below a third reference value, that the recording motion is invalid to end the generation of the gesture profile to return to the standby mode, and a sixth step of storing a reference rotation amount, which is a value obtained by dividing a maximum angular velocity with respect to the roll axis from the start time to the completion time of the recording motion by a maximum angular velocity with respect to the pitch axis, and a reference interference amount, which is a value obtained by dividing a maximum angular velocity with respect to the yaw axis from the start time to the completion time of the recording motion by a maximum angular velocity with respect to the pitch axis, in a memory as the user's characteristic values, and the completion time of the recording motion is determined as a time when a current angular velocity value with respect to the pitch axis becomes below a reference ratio of the maximum angular velocity with respect to the pitch axis after the start time of the recording motion.

The user's gesture profile may be generated by the user making the recording motion a number of times, each number may be counted only when all operations from the first step to the sixth step are completed, the reference rotation amount may be determined based on reference rotation amounts acquired over a number of times, respectively, and the reference interference amount may be determined based on reference interference amounts acquired over a number of times, respectively.

The determining of whether the user's recognition motion matches the reference motion may include a seventh step of determining, when an inclination value with respect to the roll axis of the electronic device is within the first reference range, that the recognition motion is ready, an eighth step of determining, when the recognition motion is ready, that the recognition motion has started when an angular velocity with respect to the pitch axis is above the first reference value, a ninth step of ending, when the recognition motion is started, recognition and returning to a standby state when the inclination with respect to the roll axis of the recognition motion is out of the second reference range, a tenth step of ending, when an angular velocity with respect to the pitch axis at a completion time of the recognition motion is below the second reference value, recognition and returning to the standby state, an eleventh step of determining, when a cumulative value of linear acceleration velocity with respect to the Z-axis from a start time of the recognition motion to a completion time of the recognition motion is below the third reference value, that the recognition motion is invalid to end recognition to return to the standby mode, and a twelfth step of comparing a current rotation amount, which is a value obtained by dividing a maximum angular velocity with respect to the roll axis from the start time to the completion time of the recognition motion by a maximum angular velocity with respect to the pitch axis, and a current interference amount, which is a value obtained by dividing a maximum angular velocity with respect to the yaw axis from the start time to the completion time of the recognition motion by a maximum angular velocity with respect to the pitch axis, with the reference rotation amount and the reference interference amount previously stored in the memory, respectively, wherein whether the recognition motion matches the reference motion is determined based on the comparison result, and the completion time of the recognition motion is determined as a time when a current angular velocity value with respect to the pitch axis becomes below a reference ratio of the maximum angular velocity with respect to the pitch axis after the start time of the recognition motion.

A method for outputting a control signal based on a user's up move motion in an electronic device may include acquiring acceleration values for an X-axis in a left-right direction, a Y-axis in an up-down direction, and a Z-axis in a front-rear direction, respectively, based on acceleration data received from an accelerometer of the electronic device, acquiring angular velocity values for a yaw axis, a pitch axis, and a roll axis, respectively, based on gyro data received from a gyroscope of the electronic device, acquiring inclination values for a yaw axis, a pitch axis, and a roll axis, respectively, based on acceleration data, gyro data, and geomagnetic data acquired from the accelerometer, the gyroscope, and the magnetometer of the electronic device, respectively, generating, when a current operation mode is a gesture recording mode, the user' gesture profile corresponding to a reference motion by making a recording motion in which the user makes the reference motion at least once, and determining, when the current operation mode is a gesture recognition mode, whether the user's recognition motion matches the reference motion, wherein the reference motion is an up move, and the generating of the user's gesture profile includes a first step of determining, when an inclination with respect to the roll axis of the electronic device is within a first reference range, that the recording motion is ready, a second step of determining, when the recording motion is ready, that the recording motion has started when an angular velocity with respect to the yaw axis is above a first reference value, a third step of ending, when the recording motion is started, the generation of the gesture profile and returning to a standby state when the inclination with respect to the roll axis of the recording motion is out of a second reference range, a fourth step of ending, when an angular velocity with respect to the yaw axis at a completion time of the recording motion is below a second reference value, the generation of the gesture profile and returning to the standby state, a fifth step of determining, when a cumulative value of linear acceleration velocity with respect to the X-axis from a start time to a completion time of the recording motion is below a third reference value, that the recording motion is invalid to end the generation of the gesture profile to return to the standby mode, and a sixth step of storing a reference rotation amount, which is a value obtained by dividing a maximum angular velocity with respect to the roll axis from the start time to the completion time of the recording motion by a maximum angular velocity with respect to the yaw axis, and a reference interference amount, which is a value obtained by dividing a maximum angular velocity with respect to the pitch axis from the start time to the completion time of the recording motion by a maximum angular velocity with respect to the yaw axis, in a memory as the user's characteristic values, and the completion time of the recording motion is determined as a time when a current angular velocity value with respect to the yaw axis becomes below a reference ratio of the maximum angular velocity with respect to the yaw axis after the start time of the recording motion.

The user's gesture profile may be generated by the user making the recording motion a number of times, each number may be counted only when all operations from the first step to the sixth step are completed, the reference rotation amount may be determined based on reference rotation amounts acquired over a number of times, respectively, and the reference interference amount may be determined based on reference interference amounts acquired over a number of times, respectively.

The determining of whether the user's recognition motion matches the reference motion may include a seventh step of determining, when an inclination with respect to the roll axis of the electronic device is within the first reference range, that the recognition motion is ready, an eighth step of determining, when the recognition motion is ready, that the recognition motion has started when an angular velocity with respect to the yaw axis is above the first reference value, a ninth step of ending, when the recognition motion is started, recognition and returning to a standby state when the inclination with respect to the roll axis of the recording motion is out of the second reference range, a tenth step of ending, when an angular velocity with respect to the yaw axis at a completion time of the recognition motion is below the second reference value, recognition and returning to the standby state, an eleventh step of determining, when a cumulative value of linear acceleration velocity with respect to the X-axis from a start time to a completion time of the recognition motion is below the third reference value, that the recognition motion is invalid to end recognition to return to the standby mode, and a twelfth step of comparing a current rotation amount, which is a value obtained by dividing a maximum angular velocity with respect to the roll axis from the start time to the completion time of the recognition motion by a maximum angular velocity with respect to the yaw axis, and a current interference amount, which is a value obtained by dividing a maximum angular velocity with respect to the pitch axis from the start time to the completion time of the recognition motion by a maximum angular velocity with respect to the yaw axis, with the reference rotation amount and the reference interference amount previously stored in the memory, respectively, wherein whether the recognition motion matches the reference motion is determined based on the comparison result, and the completion time of the recognition motion is determined as a time when a current angular velocity value with respect to the yaw axis becomes below a reference ratio of the maximum angular velocity with respect to the yaw axis after the start time of the recognition motion.

A method for outputting a control signal based on a user's down move motion in an electronic device may include acquiring acceleration values for an X-axis in a left-right direction, a Y-axis in an up-down direction, and a Z-axis in a front-rear direction, respectively, based on acceleration data received from an accelerometer of the electronic device, acquiring angular velocity values for a yaw axis, a pitch axis, and a roll axis, respectively, based on gyro data received from a gyroscope of the electronic device, acquiring inclination values for a yaw axis, a pitch axis, and a roll axis, respectively, based on acceleration data, gyro data, and geomagnetic data acquired from the accelerometer, the gyroscope, and the magnetometer of the electronic device, respectively, generating, when a current operation mode is a gesture recording mode, the user' gesture profile corresponding to a reference motion by making a recording motion in which the user makes the reference motion at least once, and determining, when the current operation mode is a gesture recognition mode, whether the user's recognition motion matches the reference motion, wherein the reference motion is a down move, the generating of the user's gesture profile includes a first step of determining, when an inclination with respect to the roll axis of the electronic device is within a first reference range, that the recording motion is ready, a second step of determining, when the recording motion is ready, that the recording motion has started when an angular velocity with respect to the yaw axis is above a first reference value, a third step of ending, when the recording motion is started, the generation of the gesture profile and returning to a standby state when the inclination with respect to the roll axis of the recording motion is out of a second reference range or an absolute value of the inclination with respect to the pitch axis is above a second reference value, and the inclination with respect to the roll axis is below a third reference value, a fourth step of ending, when an angular velocity with respect to the yaw axis at a completion time of the recording motion is below a fourth reference value, the generation of the gesture profile and returning to the standby state, a fifth step of determining, when a cumulative value of linear acceleration velocity with respect to the X-axis from a start time to a completion time of the recording motion is below a fifth reference value, that the recording motion is invalid to end the generation of the gesture profile to return to the standby mode, and a sixth step of storing a reference rotation amount, which is a value obtained by dividing a maximum angular velocity with respect to the roll axis from the start time to the completion time of the recording motion by a maximum angular velocity with respect to the yaw axis, and a reference interference amount, which is a value obtained by dividing a maximum angular velocity with respect to the pitch axis from the start time to the completion time of the recording motion by a maximum angular velocity with respect to the yaw axis, in a memory as the user's characteristic values, and the completion time of the recording motion is determined as a time when a current angular velocity value with respect to the yaw axis becomes below a reference ratio of the maximum angular velocity with respect to the yaw axis after the start time of the recording motion.

The user's gesture profile may be generated by the user making the recording motion a number of times, each number may be counted only when all operations from the first step to the sixth step are completed, the reference rotation amount may be determined based on reference rotation amounts acquired over a number of times, respectively, and the reference interference amount may be determined based on reference interference amounts acquired over a number of times, respectively.

The determining of whether the user's recognition motion matches the reference motion may include a seventh step of determining, when an inclination with respect to the roll axis of the electronic device is within the first reference range, that the recognition motion is ready, an eighth step of determining, when the recognition motion is ready, that the recognition motion has started when an angular velocity with respect to the yaw axis is above the first reference value, a ninth step of ending, when the recognition motion is started, recognition and returning to a standby state when the inclination with respect to the roll axis of the recording motion is out of the second reference range or an absolute value of the inclination with respect to the pitch axis is above a second reference value, and the inclination with respect to the roll axis is below a third reference value, a tenth step of ending, when an angular velocity with respect to the yaw axis at a completion time of the recognition motion is below the fourth reference value, recognition and returning to the standby state, an eleventh step of determining, when a cumulative value of linear acceleration velocity with respect to the X-axis from a start time to a completion time of the recognition motion is below the fifth reference value, that the recognition motion is invalid to end recognition to return to the standby mode, and a twelfth step of comparing a current rotation amount, which is a value obtained by dividing a maximum angular velocity with respect to the roll axis from the start time to the completion time of the recognition motion by a maximum angular velocity with respect to the yaw axis, and a current interference amount, which is a value obtained by dividing a maximum angular velocity with respect to the pitch axis from the start time to the completion time of the recognition motion by a maximum angular velocity with respect to the yaw axis, with the reference rotation amount and the reference interference amount previously stored in the memory, respectively, wherein whether the recognition motion matches the reference motion is determined based on the comparison result, and the completion time of the recognition motion is determined as a time when a current angular velocity value with respect to the yaw axis becomes below a reference ratio of the maximum angular velocity with respect to the yaw axis after the start time of the recognition motion.

An electronic device for outputting a control signal based on a user's motion may include an accelerometer, a gyroscope, a magnetometer, a first processor that acquires acceleration values for an X-axis in a left-right direction, a Y-axis in an up-down direction, and a Z-axis in a front-rear direction, respectively, based on acceleration data received from the accelerometer, acquires angular velocity values for a yaw axis, a pitch axis, and a roll axis, respectively, based on gyro data received from the gyroscope of the electronic device, and acquires inclination values for a yaw axis, a pitch axis, and a roll axis, respectively, based on acceleration data, gyro data, and geomagnetic data acquired from the accelerometer, the gyroscope, and the magnetometer of the electronic device, respectively, a second processor that acquires, at periodic intervals from the first processor, acceleration values for the X-axis in a left-right direction, the Y-axis in an up-down direction, and the Z-axis in a front-rear direction, respectively, angular velocity values for the yaw axis, the pitch axis, and the roll axis, respectively, and inclination values for the yaw axis, the pitch axis, and the roll axis, respectively, and a memory for storing a reference rotation amount and a reference interference amount for the user's recording motion as the user's characteristic values.

When a current operation mode is a gesture recording mode, a reference rotation amount and a reference interference amount may be acquired from motion data acquired from the recording motion made by the user and stored in the memory, and when the current operation mode is a gesture recognition mode, a rotation amount and an interference amount acquired from a recognition motion made by the user may be compared with the reference rotation amount and the reference interference amount, respectively, wherein the recording motion includes a left, right, up, or down move motion, the user's characteristic values includes a first reference rotation amount and a first reference interference amount for the user's left move motion, a second reference rotation amount and a second reference interference amount for the user's right move motion, a third reference rotation amount and a third reference interference amount for the user's up move motion, and a fourth reference rotation amount and a fourth reference interference amount for the user's down move motion, when the recording motion is a left, up, or down move motion, the reference rotation amount is a value obtained by dividing a maximum angular velocity with respect to the roll axis by a maximum angular velocity with respect to the yaw axis from a start time to a completion time of the recording motion, the reference interference amount is a value obtained by dividing a maximum angular velocity with respect to the pitch axis by a maximum angular velocity with respect to the yaw axis from the start time to the completion time of the recording motion, when the recording motion is a right move motion, the reference rotation amount is a value obtained by dividing a maximum angular velocity with respect to the roll axis by a maximum angular velocity with respect to the pitch axis from the start time to the completion time of the recording motion, and the reference interference amount is a value obtained by dividing a maximum angular velocity with respect to the yaw axis by a maximum angular velocity with respect to the pitch axis from the start time to the completion time of the recording motion.

Hereinafter, some embodiments will be described clearly and in detail with reference to the accompanying drawings so that persons having ordinary skills in the art (hereinafter, referred to as those skilled in the art) may easily practice the present disclosure.

In addition, as used herein, the term "unit" or "module" may refer to a hardware element or a circuit such as a field programmable gate array (FPGA) or an application specific integrated circuit (ASIC).

Terms such as first, second, and the like may be used to describe various elements (steps, values, hardware modules, etc.), but the elements should not be limited by the terms. The terms are used merely for the purpose to distinguish an element from another element.

Hereinafter, "content" may include media themselves, such as games, music, movies, images, animations, characters, items, objects, and the like, or objects reproduced on the media, but is not limited thereto. The "content" may include an operating system or software running on a host device. The software may include a document program, such as a word processor or PowerPoint, an image processing program for performing professional tasks, a CAD program, and a game. The "content" may include virtual content generated in virtual reality such as AR/VR/MR. The "content" may include an object reproduced on a two-dimensional screen, or a three-dimensional object displayed on a three-dimensional space such as a hologram. The "content" may be generated, executed, or reproduced by the host device. When the "content" is virtual content (e.g., a hologram) displayed on a three-dimensional space, the physical positions of the host device and the "content" may be different from each other.

Hereinafter, a "motion" is a meaningful movement made by a user to control content, and may be captured, extracted, recognized, analyzed, or determined from the user's movement.

Hereinafter, a "control signal" is a signal including information on a motion itself or a type of the motion, and an electronic device may generate a "control signal" and a host device may operate or control content based on the "control signal" received from the electronic device. For example, the "control signal" may be in the form of a bit string, and each motion may be represented by a different bit string.

Figure 1B:
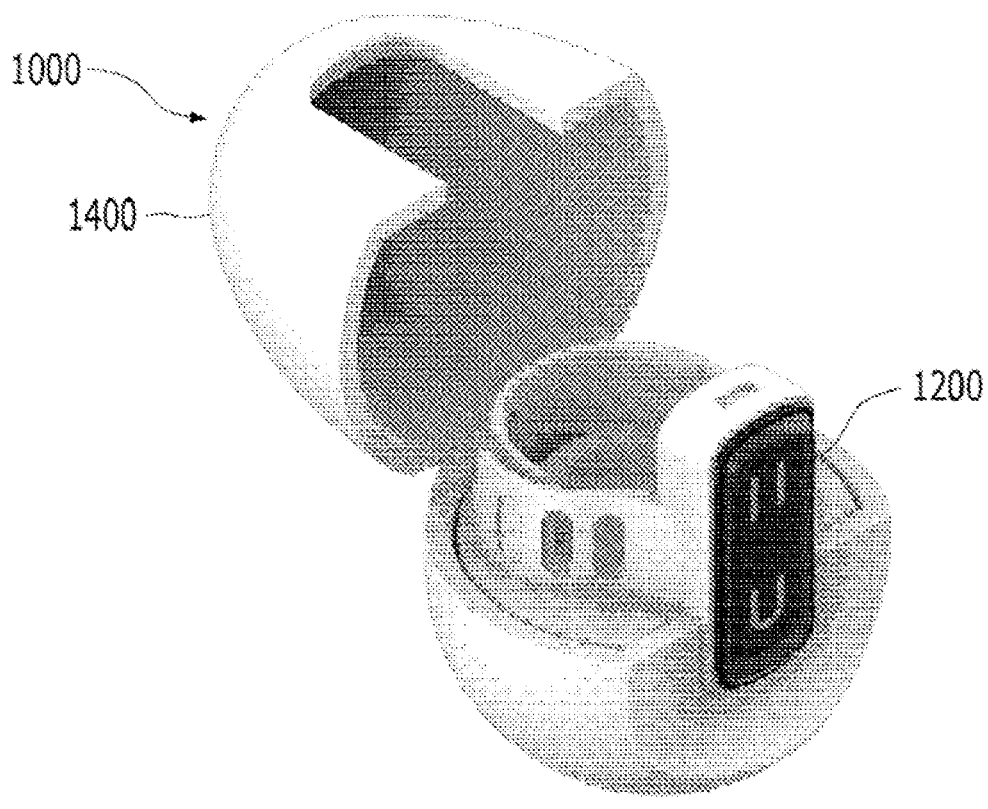
FIG. 1B shows an electronic device (in an open state) for controlling a host device, according to one embodiment.

FIG. 1A shows an electronic device (in a closed state) for controlling a host device, according to one embodiment. FIG. 1B shows an electronic device (in an open state) for controlling a host device, according to one embodiment.

[54] A user may control a host device by a touch or a movement of his or her hand while gripping or holding an electronic device 1000 in his or her hand. The host device may include various types of electronic devices. For example, the host device may be any one of a game console, a smart phone, a tablet PC (personal computer), a TV, a desktop PC, a laptop PC, a mobile medical device, a camera, and a wearable device (e.g., electronic glasses, an electronic cloth, an electronic bracelet, an electronic necklace, an electronic accessory, an electronic tattoo, or a smart watch), but is not limited thereto. For example, the host device may include a head mounted display (HMD) for displaying virtual content and a game console (e.g., console device) for running or playing a virtual reality game or virtual reality content. The host device may include a computer for displaying presentation materials.

Referring to FIGS. 1A and 1B together, the electronic device 1000 may include a ring-shaped device 1200 that can be worn on the user's finger and a cradle device 1400 for accommodating the ring-shaped device 1200. The user may accommodate the ring-shaped device 1200 in the cradle device 1400 and close a lid thereof.

While the ring-shaped device 1200 is accommodated in the cradle device 1400 and the lid of the cradle device 1400 is closed, a front portion (head portion) of the ring-shaped device 1200 may be exposed to a front surface of the cradle device 1400, and the user may generate a motion signal by moving the cradle device 1400 while holding it in his or her hand, or may perform a touch operation by touching the exposed front portion of the ring-shaped device 1200. According to one embodiment, a touch sensing module may be positioned on the front portion of the ring-shaped device 1200.

The user may open the lid of the cradle device 1400 to take out the ring-shaped device 1200. The user may control the host device through a touch operation or motion while wearing the ring-type device 1200 on his or her finger. The cradle device 1400 may be manufactured in a shape that is easy for a person to hold in his or her hand, and the center of gravity of the cradle device 1400 may be designed to be low by placing an additional center of gravity weight at the bottom of the cradle device 1400. The cradle device 1400 may include a charging terminal and a power supply device for charging the ring-shaped device 1200.

The ring-type device 1200 may include a motion sensor for acquiring the user's movement information and a touch sensor for acquiring the user's touch information. The ring-type device 1200 may generate a control signal based on the acquired movement information and touch information and output the generated control signal to the host device. The host device may control content based on the control signal received from the ring-type device 1200.

Figure 2A:
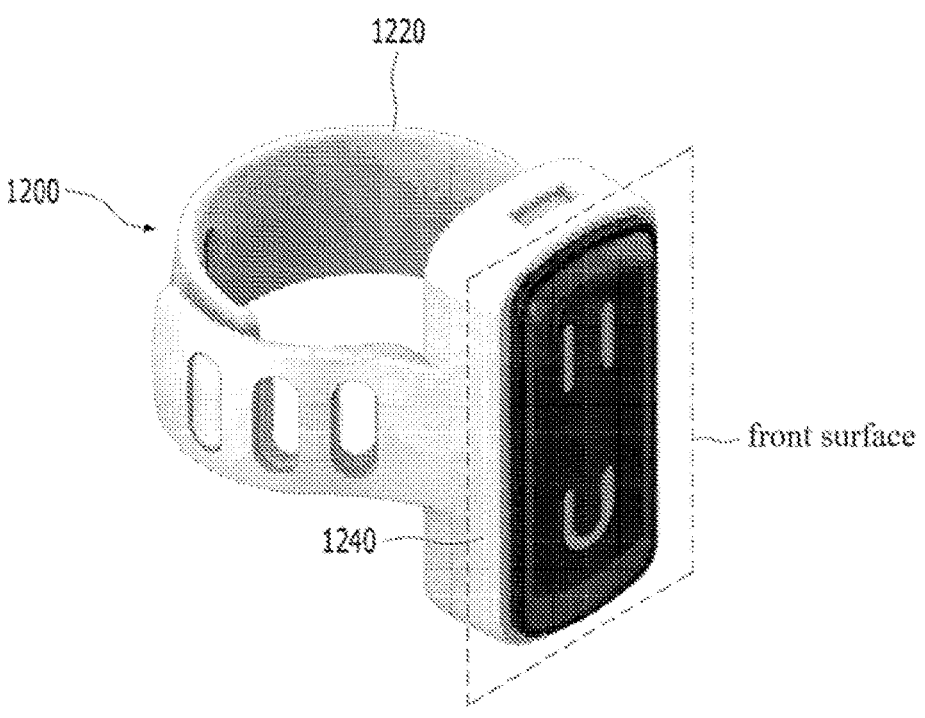
FIG. 2A shows a ring-shaped device within an electronic device, according to one embodiment.
Figure 2B:
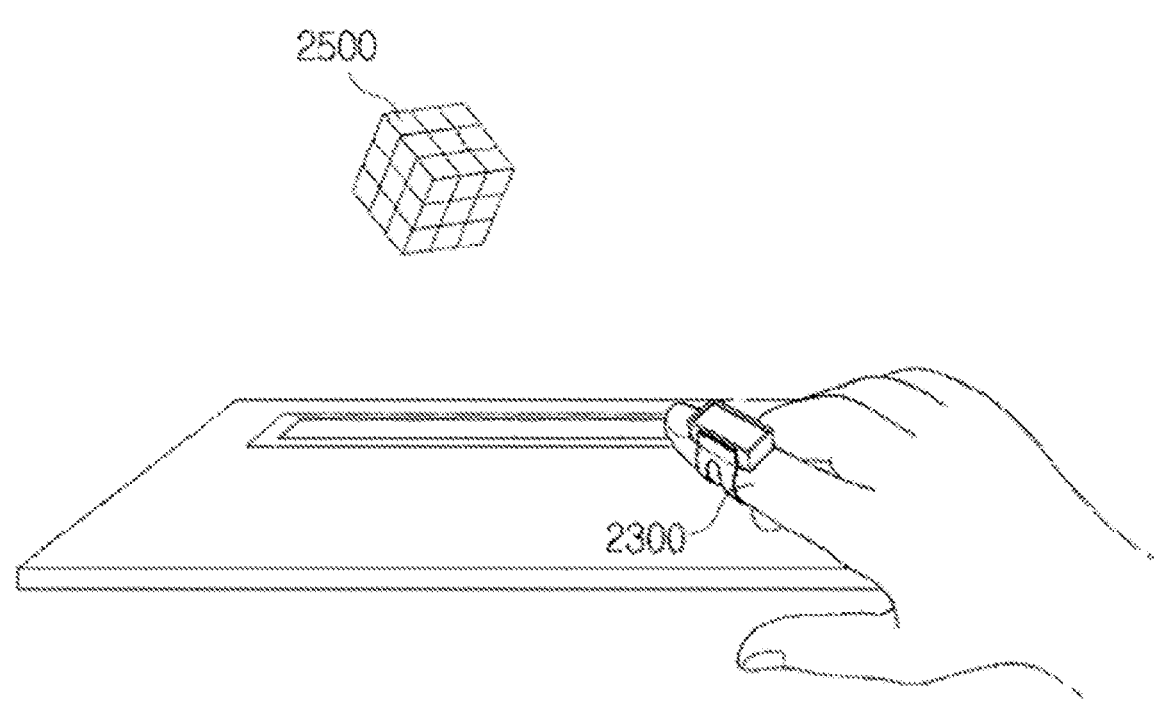
FIG. 2B shows controlling content using an electronic device, according to one embodiment.

FIG. 2A shows a ring-type device, according to an embodiment, and FIG. 2B shows a user who controls content while wearing the ring-type device, according to an embodiment.

Referring to FIGS. 2A and 2B together, the ring-shaped device 1200 may be a small wearable device that can be attached to, connected to, or worn by a human body or an object. The ring-shaped device 1200 may be comfortable to wear, and the user may intuitively operate the functions of the ring-shaped device 1200 without any additional learning. Furthermore, the ring-type device 1200 may be used as a general-purpose device like a general-purpose mouse by using movement information and touch information.

The ring-shaped device 1200 may include a connection portion 1220 to be worn on the user's finger 2300 and a main module 1240 to acquire movement information and touch information using a sensor. The connection portion 1220 may be made of a material such as silicon or metal. The main module 1240 may acquire the user's touch information and movement information and output a control signal corresponding to the acquired information. The main module 1240 may include the elements of an electronic device 3000, which will be described later, and a case having the elements built therein. According to one embodiment, the main module 1240 may be separated from the connection portion 1220, and the user may insert, attach, or embed only the main module 1240 into various types of objects (a cane, a dice, a pen, etc.) to control the host device using the various types of objects.

The main module 1240 may acquire touch information and movement information (e.g., angular velocity, acceleration, speed, distance, angle, direction, and position (3-dimensional space coordinate) information) for the movement of the main module 1240 to process and handle the acquired information, thereby outputting a control signal for controlling content 2500.

In FIG. 2B, the ring-shaped device 1200 is shown as being worn on the user's finger 2300, but the ring-shaped device 1200 may be connected to or attached to another type of object.

For example, the main module 1240 may be built into a dice and the content 2500 may be controlled based on the movement of the dice. Alternatively, the main module 1240 may be attached to a cane to control the content 2500 based on the movement of the cane. Alternatively, the main module 1240 may be built into the pen and the content 2500 on the smartphone may be controlled based on the movement of the pen. Hereinafter, the object may refer to a human body part (e.g., a finger), an object that a person can wear or lift, or the electronic device 3000 itself, which will be described later.

In addition, in FIG. 2B, the content 2500 is shown as a holographic object on a three-dimensional space, but the content 2500 may also include any type of content or software (Microsoft's MS Office, games, etc.) played on the host device.

Figure 3:
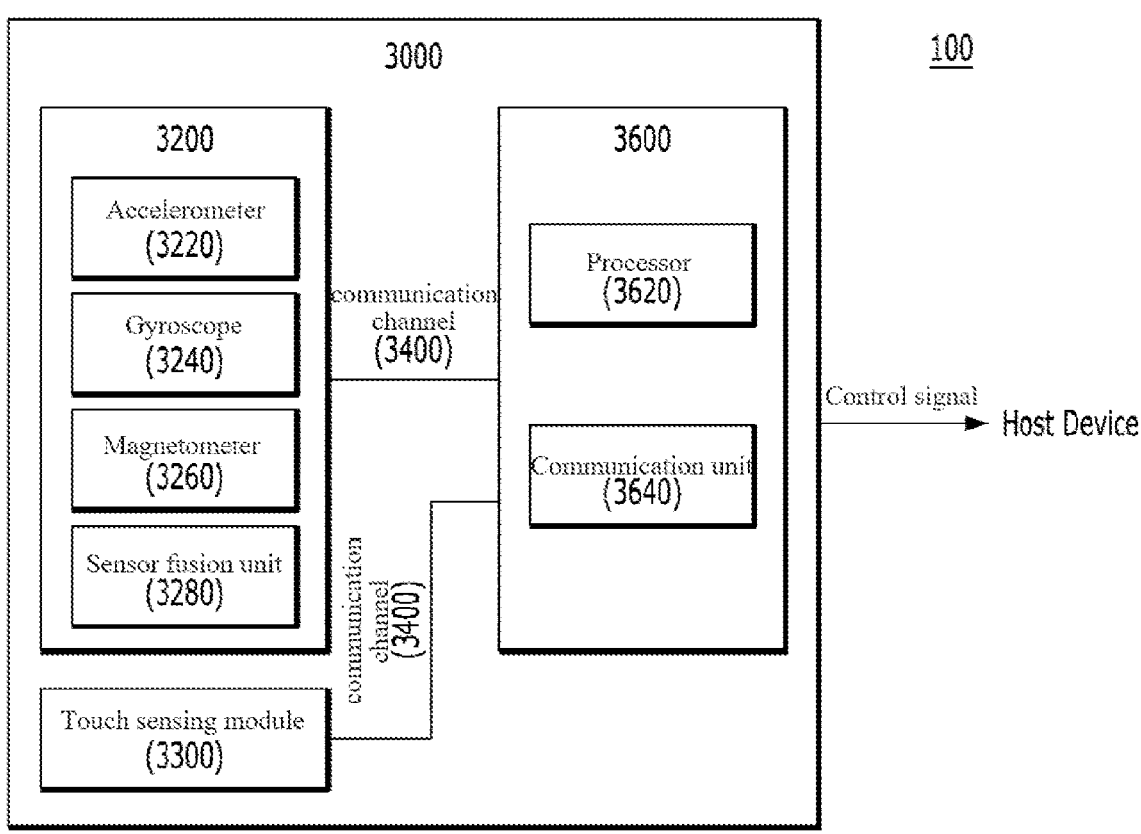
FIG. 3 shows a system including an electronic device, according to one embodiment.

FIG. 3 shows a system including an electronic device, according to one embodiment.

Referring to FIG. 3, a system 100 may include an electronic device 3000 and a host device (or target device). The electronic device 3000 may be connected to the host device through wireless communication. For example, the electronic device 3000 may be paired with the host device using Bluetooth. The electronic device 3000 may refer to a cradle device 1400 in which the ring-shaped device 1200 in FIG. 1A is accommodated, the ring-shaped device 1200 separated from the cradle device 1400, or a main module 1240 of the ring-shaped device 1200 in FIG. 2A.

A user may control various content of the host device using the electronic device 3000. According to one embodiment, the user may control the content of the host device based on the movement of the electronic device 3000 itself or an object connected to the electronic device 3000 and/or a user touch operation input to the electronic device 3000. For example, the user may wear the electronic device 3000 on his or her finger to move the finger or touch the electronic device 3000 with the finger control, thereby controlling various content of the host device.

Referring to FIG. 3, the electronic device 3000 may include a movement sensing module 3200, a touch sensing module 3300, a communication channel 3400, and a control signal output unit 3600.

The electronic device 3000 may operate in a mouse mode or gesture mode. Under the mouse mode, the electronic device 3000 may operate like a general-purpose mouse, and under the gesture mode, the electronic device 3000 may operate as a motion recognition device.

Under the mouse mode, the electronic device 3000 may determine a mouse operation based on at least one of a touch operation detected through the touch sensing module 3300 and movement information detected through the movement sensing module 3200 and output a mouse signal indicating the mouse operation.

For example, a mouse click may be performed by touching one side of the electronic device 3000 once, a mouse double click may be performed by touching one side of the electronic device 3000 twice within a reference time period, a mouse move may be determined from movement information (e.g., second movement information described below) of the electronic device 3000, a mouse scroll (scroll up/down) may be determined by a continuous change in touch (e.g., scroll up by a movement of writing from left to right with a finger on one side of the electronic device 3000, and scroll down by a movement of writing from right to left with a finger on one side of the electronic device 3000), and a mouse drag may be determined by a touch time period (e.g., long touch) and the movement information of the electronic device 3000. According to one embodiment, when the touch time period is less than 200 ms, it may be determined as a short touch, and if the touch time period is above 500 ms, it may be determined as a long touch. One side of the electronic device 3000 on which a touch operation is performed may be a front portion of the touch sensing module 3300, which has been described with reference to FIG. 2A.

Under the gesture mode, the electronic device 3000 may acquire the movement information of the electronic device 3000 using a sensor, and determine a motion corresponding to the movement of the electronic device 3000 based on the acquired movement information. The electronic device 3000 may output a motion signal indicating the determined motion to the host device. According to one embodiment, the movement information may include features (e.g., at least one of angular velocity, acceleration, speed, distance, angle, direction, and position) for the movement of the object.

Hereinafter, the operations and functions of the elements of the electronic device 3000 will be described.

Referring to FIG. 3, the touch sensing module 3300 may detect the user's touch. For example, when the user touches the front portion of the ring-shaped device 1200 with his or her thumb while wearing the ring-shaped device 1200 on his or her index finger, the touch sensing module 3300 may detect a touch operation. The touch operation detected by the touch sensing module 3300 may be transmitted to the control signal output unit 3600 through the communication channel 3400.

The touch operation detected by the touch sensing module 3300 may be used to determine a mouse operation under the above-described mouse mode. Alternatively, the touch operation detected by the touch sensing module 3300 may be used to determine a motion corresponding to the movement of an object under the gesture mode. Additionally, the touch operation detected by the touch sensing module 3300 may be used to switch between the mouse mode and the gesture mode.

Switching between the mouse mode and the gesture mode may be performed by a touch operation. For example, when the user's short touch, short touch, and long touch are successively detected through the touch sensing module 3300, the gesture mode may be switched to the mouse mode, or the mouse mode may be switched to the gesture mode. Alternatively, when a center portion of the front portion of the ring-shaped device 1200 is touched through the touch sensing module 3300 for more than a reference time period, the gesture mode may be switched to the mouse mode or the mouse mode may be switched to the gesture mode.

The movement sensing module 3200 may acquire first movement information of the electronic device 3000. The first movement information may be used in both the mouse mode and the gesture mode. The first movement information may include at least one of acceleration data acquired through an accelerometer and angular velocity data acquired through a gyroscope.

The movement sensing module 3200 may include an accelerometer 3220, a gyroscope 3240, a magnetometer 3260, and a sensor fusion unit 3280. The gyroscope 3240 according to one embodiment is a sensor for measuring angular velocity. The accelerometer 3220 according to one embodiment is a sensor for measuring acceleration and measuring dynamic forces such as vibration and shock. The magnetometer 3260 according to one embodiment is a sensor for measuring earth magnetism and detecting a magnitude thereof.

A value measured by the gyroscope 3240 may have an error due to the influence of temperature, and the error may be accumulated during the integration process, causing a phenomenon in which the final value drifts. Therefore, it is necessary to compensate for the error of the gyroscope 3240 by also using a temperature sensor.

In terms of a long period of time in a stationary state, a tilt angle calculated by the accelerometer 3220 may indicate a correct value, but the gyroscope 3240 may indicate an incorrect value due to a cumulative drift over time. Conversely, in terms of a short period of time in motion, the gyroscope 3240 may indicate a correct angular velocity, but the accelerometer 3220 may produce a calculation value different from the tilt angle. Additionally, when a subject moves in a straight direction while being in a stationary state, inclination measurement is not possible.

Therefore, in order to supplement and compensate for the shortcomings of both the accelerometer 3220 and the gyroscope 3240, a filter such as a Kalman filter or a compensation and fusion algorithm may be applied. However, despite such a compensation and fusion operation, when only the gyroscope 3240 and the accelerometer 3220 are used, the error rate increases when calculating coordinates in a three-dimensional space, so it is unsuitable for use as an interface to control a host device such as a VR device. Additionally, when only the accelerometer 3220 and the gyroscope 3240 are used, it is difficult to determine an absolute position of a moving subject because a relative azimuth is used rather than an absolute azimuth.

Therefore, the movement sensing module 3200 may further include the magnetometer 3260 to calculate a change in absolute azimuth measured by the magnetometer 3260 together with data measured by the accelerometer 3220 and the gyroscope 3240, thereby generating data with a low error rate. The movement sensing module 3200 may further include the magnetometer 3260 to more completely compensate for a cumulative drift occurring in the gyroscope 3240, and the gyroscope 3240 may solve the phenomenon of instantaneous magnetic field bouncing (a sudden large change in magnetic field) caused by a magnetic change of the magnetometer 3260, thereby playing a role in complementing and compensating for each other's shortcomings.

According to one embodiment, the movement sensing module 3200 may include a 9-axis sensor capable of accurately acquiring position data on a three-dimensional space. The 9-axis sensor, which is a sensor consisting of 3 axes of acceleration, 2 axes of gyro, 3 axes of geomagnetism, and 1 axis of temperature, is a sensor capable of acquiring both a 3-dimensional position and a degree of rotation in 3-axis directions on a three-dimensional space.

Referring to FIG. 3, the movement sensing module 3200 may include a sensor fusion unit 3280 for performing a sensor fusion operation to generate optimized position data by compensating for and fusing the outputs of the sensors 3220, 3240, 3260. The sensor fusion unit 3280 may optimize data by removing noise, compensating for, and fusing the data acquired from the accelerometer 3220, the gyroscope 3240, and the magnetometer 3260, thereby providing first movement information. When row data acquired by the sensors 3220, 3240, 3260 is used as it is, accurate position data cannot be acquired, so optimized position data may be generated by perform position estimation on an exact position through a filter. For example, a sensor fusion operation may be performed based on a filter such as a Kalman filter or a data compensation and fusion algorithm.

The first movement information acquired through the movement sensing module 3200 may be transmitted to the control signal output unit 3600 through the communication channel 3400. According to one embodiment, the communication channel 3400 may be an internal bus within the electronic device 3000 for transmitting the first movement information to a processor 3620. The movement sensing module 3200 and the control signal output unit 3600 may exchange data with each other based on the bus format of the communication channel 3400. For example, the bus format may include one or more of various interface protocols such as a universal serial bus (USB), a serial peripheral interface (SPI), and an inter-integrated circuit (I2C).

The control signal output unit 3600 may output a control signal for controlling the host device. The control signal may include a motion signal and a mouse signal. The control signal output unit 3600 may acquire second movement information through the calculation of the first movement information. Under the gesture mode, the control signal output unit 3600 may determine a motion corresponding to the movement of the electronic device 3000 based on the second movement information and output a motion signal indicating the determined motion. Under the mouse mode, the control signal output unit 3600 may determine a mouse operation based on at least one of touch information and second movement information acquired from the touch sensing module 3300 and output a mouse signal indicating the mouse operation. The control signal may be an interrupt signal for controlling the content of the host device. For example, the control signal may include a bit string indicating a specific mouse signal or a specific motion signal.

The control signal output unit 3600 may generate second movement information by calculating the first movement information received through the communication channel 3400. The second movement information may include at least one of angle data, distance data, speed data, and direction data of the electronic device 3000. The second movement information of the electronic device 3000 may be used in both the mouse mode and the gesture mode. For example, under the mouse mode, the second movement information may be used to determine a mouse move operation of the electronic device 3000. Under the gesture mode, the second movement information may be used to determine various motion signals output from the electronic device 3000.

According to one embodiment, the control signal output unit 3600 may include a processor 3620 and a communication unit 3640.

The processor 3620 may generate second movement information by calculating the first movement information received from the movement sensing module 3200 through the communication channel 3400. The second movement information may include at least one of angle data, distance data, speed data, and direction data for a movement. The processor 3620 may acquire the second movement information by performing an operation on the first movement information every reference time period (e.g., 5 ms). The reference time period may be 30 ms or less, but is not limited thereto.

The angle data may include angle data for each of an x-axis direction, a y-axis direction, and a z-axis direction. According to one embodiment, the processor 3620 may acquire angle data by performing an integral operation on angular velocity data.

The speed data may include speed data for each of the x-axis direction, the y-axis direction, and the z-axis direction. The distance data may include distance data for each of the x-axis direction, the y-axis direction, and the z-axis direction. According to one embodiment, the processor 3620 may acquire speed data and distance data by performing an integral operation on acceleration data. The processor 3620 may acquire linear acceleration data by removing a gravitational acceleration component from the acceleration data. The processor 3620 may acquire speed data by performing an integral operation on the linear acceleration data, and acquire distance data by performing an integral operation again on the speed data.

The direction data relates to an instantaneous movement direction of an object and may include whether there is an increase or decrease in the x-axis direction, an increase or decrease in the y-axis direction, and an increase or decrease in the z-axis direction. According to one embodiment, the processor 3620 may include direction data based on a comparison between current distance data and previous distance data. For example, when an x-axis direction value of the current distance data is +50, a y-axis direction value is +10, and a z-axis direction value is −5, and an x-axis direction value of the previous distance data is +60, a y-axis direction value is +15, and a z-axis direction value is −10, the processor 3620 may determine a current movement direction as an increase in the x-axis direction, an increase in the y-axis direction, and a decrease in the z-axis direction.

Figure 4A:
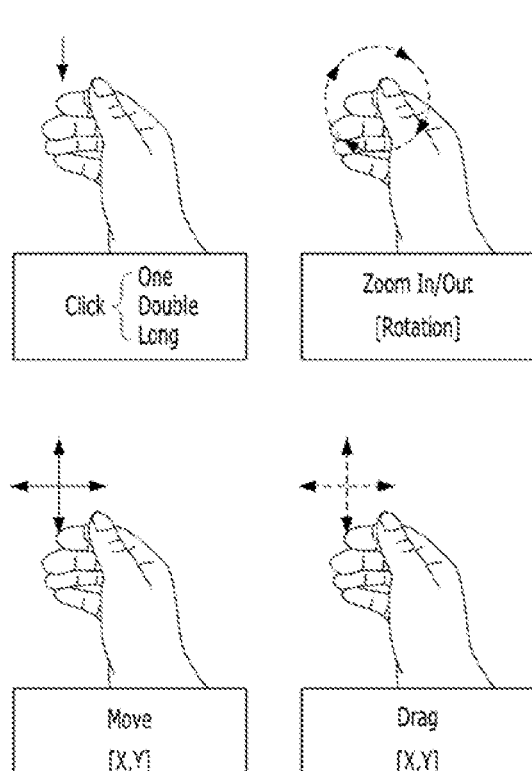
FIG. 4A shows mouse operations performed with an electronic device under a mouse mode, according to one embodiment.

Under the mouse mode, the processor 3620 may determine a corresponding mouse operation based on touch information and second movement information acquired from the touch sensing module 3300. FIG. 4A shows mouse operations performed with the electronic device 3000 under a mouse mode, according to one embodiment. The mouse operation may include a mouse click, a zoom in/out (or scroll up/down), a mouse move, and a mouse drag. The mouse click may include a one click, a double click, and a long click. The mouse move may move a mouse pointer on the host device.

Figure 4B:
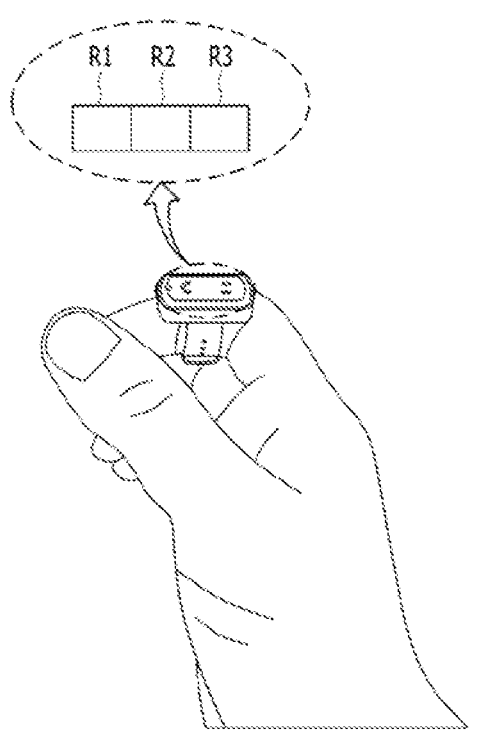
FIG. 4B shows a diagram in which a front portion of the electronic device is divided into three touch regions, according to one embodiment.
Figure 4C:
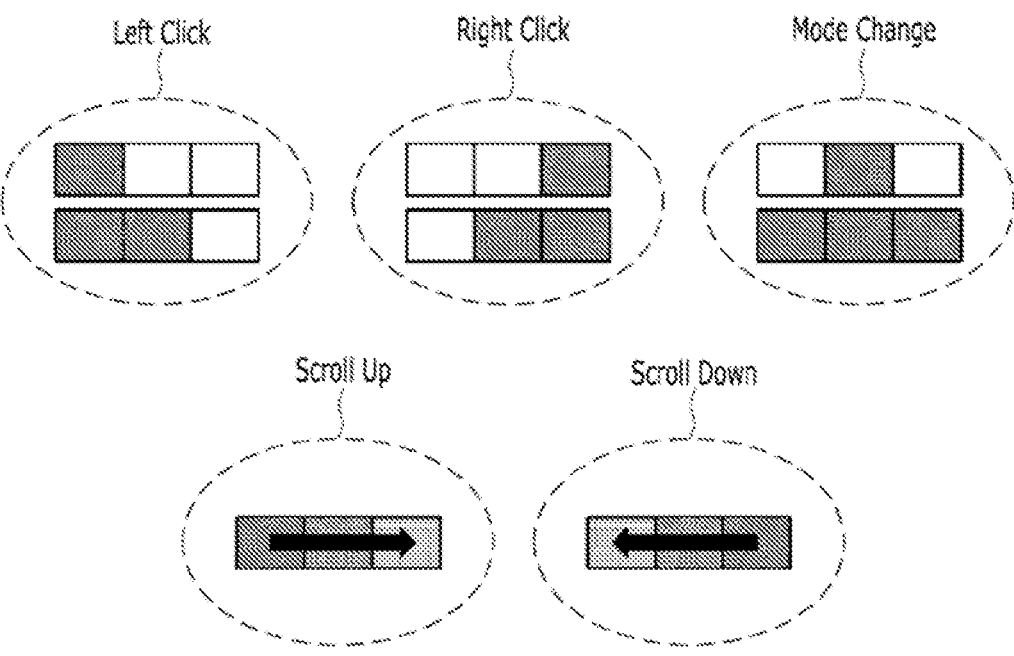
FIG. 4C shows mouse operations recognized using three regions, according to one embodiment.

Referring to FIG. 4B, for the mouse operation, a surface of the touch sensing module 3300 of the electronic device 3000 (a front side of the main module 1240 in FIG. 2A) may be divided into a touch region R1 positioned on the left, a touch region R2 positioned in the center, and a touch region R3 positioned on the right. Referring to FIG. 4C, when the user touches only the touch region R1 or touches both the touch region R1 and the touch region R2, the corresponding operation may be determined as a left click. When the user touches only the touch region R3 or touches both the touch region R3 and the touch region R2, the corresponding operation may be determined as a right click. When the user touches only the touch region R2 or touches the touch region R2, the touch region R1, and the touch region R3 together, the corresponding operation may be determined as a mode change between the mouse mode and the gesture mode. When the user sequentially and continuously touches the touch region R1, the touch region R2, and the touch region R3, the corresponding operation may be determined as scroll up. When the user sequentially and successively touches the touch region R3, the touch region R2, and the touch region R3, the corresponding operation may be determined as scroll down.

Under the mouse mode, the processor 3620 may distinguish between when the user is using a keyboard and when the user is using a mouse, and may not output a mouse signal when it is determined that the user is using the keyboard.

Under the gesture mode, the processor 3620 may determine a motion corresponding to the movement of the electronic device 3000 based on the second movement information. For example, the processor 3620 may determine one motion corresponding to the movement of the electronic device 3000 from among predefined motions based on the second movement information. The processor 3620 may generate a motion signal indicating the determined motion and transmit the generated motion signal to the host device through the communication unit 3640. If a distance between the electronic device 3000 and the host device is greater than a reference distance, or the movement of the electronic device 3000 does not correspond to any of the predefined motions or is determined to be a meaningless movement, then the processor 3620 may treat it as an exception.

The predefined motions may include move, tap, grasp, scroll, swipe, gesture, rotation, and the like. A move motion, which is an operation of moving the electronic device 3000 in a certain direction, may be used to move virtual content or turn a page. For example, the move motion may include a movement in three directions (x, y, z axes). A tap motion, which is an operation of tapping something, may be used to select or click on virtual content. The user may double-click virtual content by making a tap motion twice in succession within a reference time period. The tap motion is a separate motion from the click motion under the mouse mode. A grasp motion, which is an operation of bringing two distant objects into contact with each other, may be used to grab virtual content. A gesture may refer to a movement to express text, a symbol, or a shape (e.g., '?' or 'X').

A predefined motion may be added by a user-defined motion. The user-defined motion is a motion defined by a user rather than a manufacturer of the electronic device 3000, wherein the user may add a specific movement he or she inputs as a user-defined motion. For example, the user may repeatedly make a specific movement while holding or wearing the electronic device 3000 and match it to a specific function or motion. Movement information repeatedly made by the user and a function or motion corresponding to the movement information may be stored in the electronic device 3000 in a corresponding manner. For example, the user wearing the electronic device 3000 on his or her finger may make a stabbing operation 10 times as if stabbing something, designate it as a stabbing motion, and save it. Thereafter, when the user wears the electronic device 3000 and makes a stabbing motion, the processor 3620 may transmit a motion signal indicating the stabbing motion to the host device through the communication unit 3640.

The movement information of the electronic device 3000 may be matched to a specific motion based on machine learning. That is, when specific movement information is input to a decision model trained through machine learning, the decision model may output a motion signal corresponding to the input specific movement information.

According to one embodiment, the electronic device 3000 may use an independent decision model for each user. This is because even if users make the same movement, the movement information generated is different for each user. For example, assuming that an operation of turning an arm to draw a circle corresponds to a specific motion signal output from the electronic device 3000 or a specific function from the host device, it is because movement information generated while respective users perform the operation may not be all the same and the respective users may have their own unique patterns.

Figure 5:
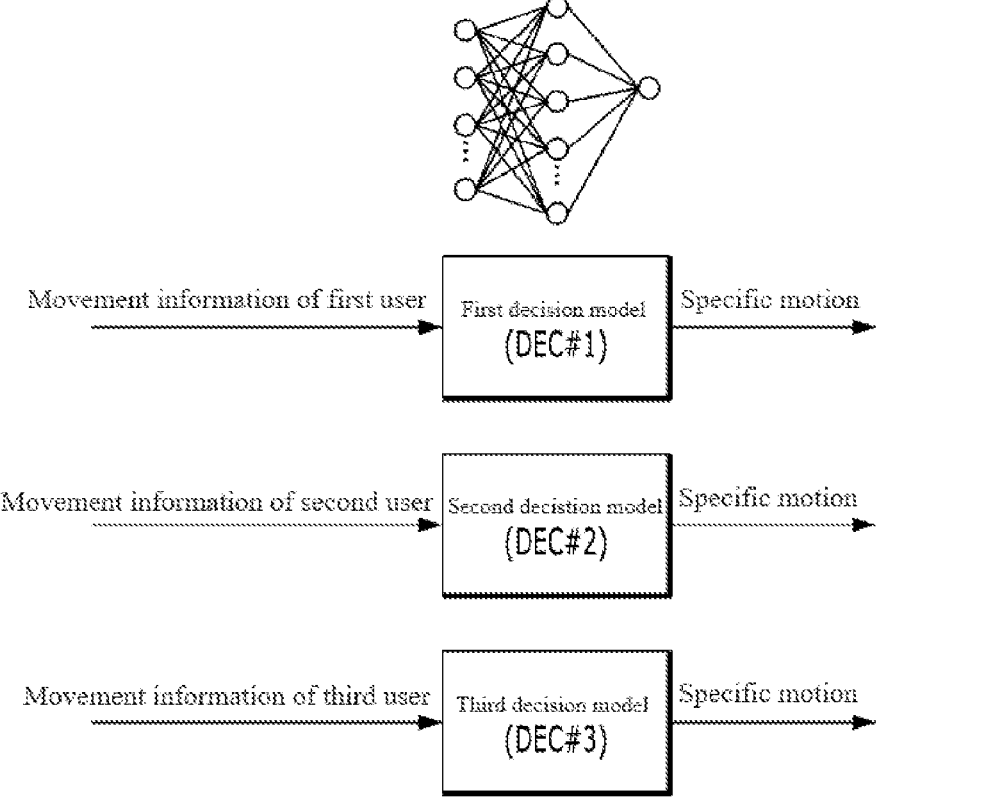
FIG. 5 shows a decision model for determining a motion corresponding to user's movement information, according to one embodiment.

Referring to FIG. 5, a first decision model DEC #1, a second decision model DEC #2, and a third decision model DEC #3 may be used to output corresponding motion signals from movement information of a first user, movement information of a second user, and movement information of a third user, respectively. If the user currently using the electronic device 3000 is the first user, then the control signal output unit 3600 or the processor 3620 may input the acquired movement information of the first user (e.g., the above-described second movement information) into the first decision model DEC #1 and determine a motion signal corresponding thereto. If the user currently using the electronic device 3000 is the third user, then the control signal output unit 3600 or the processor 3620 may input the acquired movement information of the third user (e.g., the above-described second movement information) into the third decision model DEC #3 and determine a motion corresponding thereto.

A decision model for determining a motion signal may be generated based on machine learning. For example, the first decision model DEC #1 may be generated by performing machine learning that repeatedly applies the movement information of the first user (e.g., the above-described second movement information) and the specific motion as an input and an output, respectively. The first decision model DEC #1 may receive the first user's second movement information generated from the first user's operation of turning his or her arm to draw a circle 10 times or more to be trained such that the input movement information corresponds to a specific motion signal. For example, the second decision model DEC #2 may be generated by performing machine learning that repeatedly applies the movement information of the second user (e.g., the above-described second movement information) and the specific motion as an input and an output, respectively. The second decision model DEC #2 may receive the second user's second movement information generated from the second user's operation of turning his or her arm to draw a circle 10 times or more to be trained such that the input movement information corresponds to a specific motion signal.

Machine learning techniques may include support vector machine (SVM), random forest, naive Bayes, adaptive boosting (AdaBoost), random forest, gradient boosting, K-means clustering, artificial neural network, and the like.

The machine learning-based decision model used to determine the motion signal may be stored in a memory (not shown) within the electronic device 3000 or may be stored in the host device. In addition, learning for generating a decision model may be performed in the electronic device 3000 or in the host device. According to one embodiment, learning for generating a decision model may be performed in the host device, and the generated decision model may be stored in the memory (not shown) within the electronic device 3000. Alternatively, learning about the decision model may be performed in the electronic device 3000 and the decision model may be stored in the memory (not shown) of the electronic device 3000.

FIG. 7 shows reference motions for controlling a host device with the electronic device 3000 under a gesture mode, according to one embodiment. The reference motions may refer to types of motions predefined by the manufacturer of the electronic device 3000. For example, the user may make a left move motion, a right move motion, an up move motion, a down move motion, a circle (clockwise, counter clockwise circle) motion, and a forward/back move motion, and the electronic device 3000 may output a control signal corresponding to the reference motion.

In this embodiment, the user may turn the pages of a Word document running on the host device by making a left move or right move motion in a three-dimensional space while wearing the electronic device 3000. Under the gesture mode, motions for the electronic device 3000 to control the host device are not limited to the above-described embodiments. For example, motions supported by the electronic device 3000 may further include tap, grasp, scroll, and swipe.

Referring again to FIG. 3, the processor 3620 may generate a control signal indicating a motion signal or a mouse signal. For example, when the user's movement is determined to be a left move motion, the processor 3620 may generate a first bit string indicating the left move motion as a control signal. When the user's movement is determined to be a clockwise rotation motion, the processor 3620 may generate a second bit string indicating a clockwise rotation motion as a control signal. Alternatively, when using a protocol agreed upon between the electronic device 2000 and the host device, numbers assigned to respective motions may be generated as control signals. When the user's movement is determined to be a mouse move, the processor 3620 may generate a third bit string indicating the mouse move as a control signal.

The processor 3620 may include one processor core (a single core) or may include a plurality of processor cores (a multi-core). For example, the processor 3620 may include a multi-core, such as a dual-core, a quad-core, or a hexa-core. In addition, the processor 3620 may further include a cache memory positioned internally or externally.

The communication unit 3640 may transmit a control signal to the host device through a wireless communication interface. The communication unit 3640 may include a wireless local area network (WLAN) such as wireless fidelity (Wi-Fi), a wireless personal area network (WPAN) such as Bluetooth, a wireless universal serial bus (USB), Zigbee, near field communication (NFC), radio frequency identification (RFID), or a modem communication interface that can be connected to a mobile cellular network such as 3rd Generation (3G), 4th Generation (4G), long term evolution (LTE), and the like. A Bluetooth interface may support Bluetooth Low Energy (BLE).

The electronic device 3000 may include a memory (not shown) required for an operation performed in the electronic device 3000. For example, the electronic device 3000 may include a memory (not shown) required for performing a sensor fusion operation in the sensor fusion unit 3280. In addition, the electronic device 3000 may include a memory (not shown) used to store predefined motions and/or a user-defined motion or required for an operation performed in the processor 3620. The memory (not shown) may store a decision model generated based on machine learning to determine a motion signal corresponding to a user's movement. The memory (not shown) may include a volatile memory device such as a dynamic random-access memory (DRAM) and a static random-access memory (SRAM), and a non-volatile memory device such as a flash memory device and a solid-state drive (SSD).

The electronic device 3000 may include a battery (not shown) to supply power required for an operation performed in the electronic device 3000. The battery (not shown) may include a lithium-ion battery or a lithium polymer battery, but is not limited thereto. For example, the battery (not shown) may be included in the control signal output unit 3600, and part of power output from the battery (not shown) may be bypassed to the movement sensing module 3200.

The electronic device 3000 may include a charging terminal for charging the battery (not shown). The electronic device 3000 may include a USB-type charging terminal. A current flowing in through the charging terminal may be used to charge the battery. According to one embodiment, a charging terminal may be present in the ring-shaped device 1200 of FIGS. 1A and 1B, and a charging terminal may be present in the cradle device 1400. For example, a charging terminal may be present in the main module 1240, and the ring-shaped device 1200 may be accommodated in the cradle device 1400, thereby performing charging on the main module 1240.

Hereinafter, FIGS. 8 to 9 may be carried out in the electronic device 3000 of FIG. 3. Therefore, even if a description is omitted below, the description of the electronic device 3000 or the host device in FIG. 3 may also be applicable to FIGS. 8 and 9.

Figure 8:
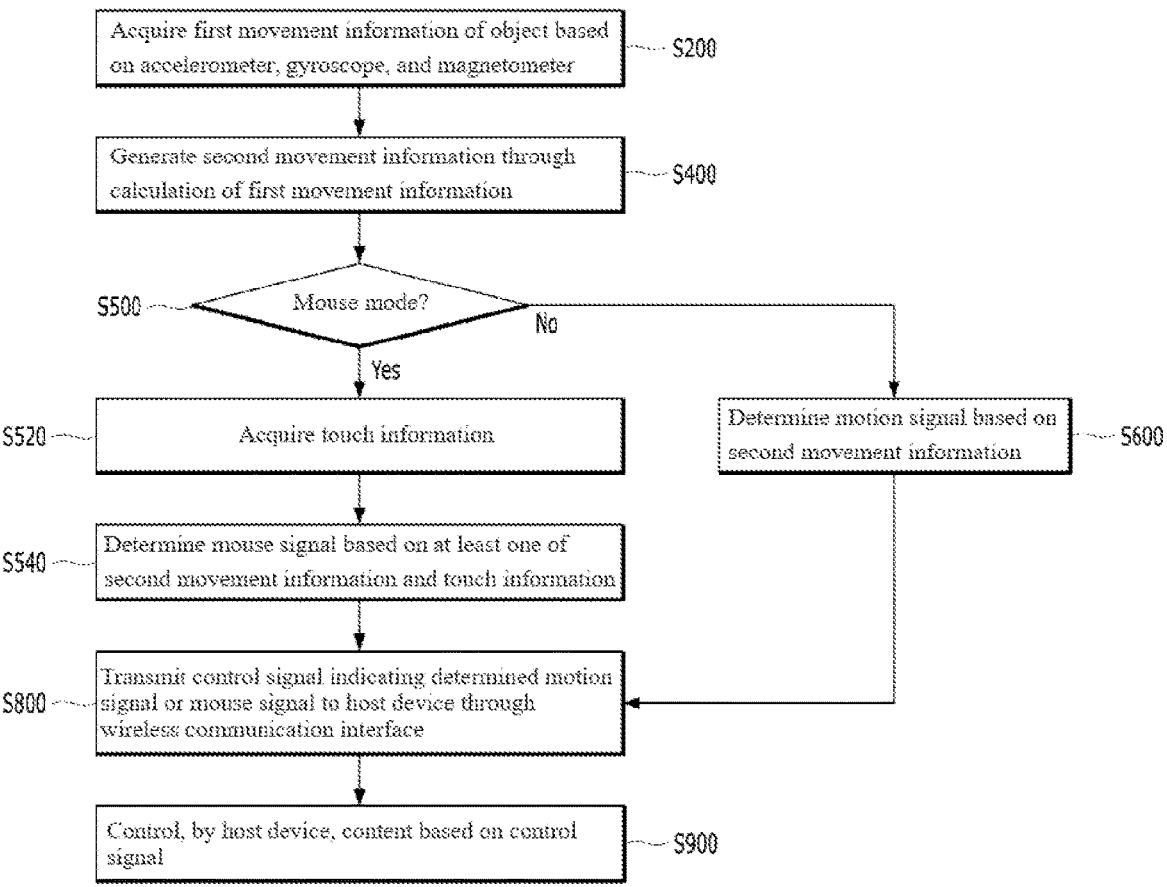
FIG. 8 shows a flowchart of a method of controlling content using an electronic device, according to one embodiment.

FIG. 8 shows a flowchart of a method of controlling content using an electronic device, according to one embodiment.

In step S200, the electronic device may acquire first movement information of an object based on a sensing module. The object may refer to the electronic device itself. The sensing module may include an accelerometer, a gyroscope, and a magnetometer. The first movement information may include acceleration data and angular velocity data for the movement of the object. For example, the first movement information may be data in which acceleration data acquired through the accelerometer and angular velocity data acquired through the gyroscope are optimized by the sensor fusion unit.

In step S400, the electronic device may generate second movement information by calculating the first movement information acquired in step S200. The second movement information may include at least one of angle data, speed data, distance data, and direction data. The electronic device may calculate and acquire second movement information in real time while the object is moving. For example, the electronic device may acquire the second movement information by performing a calculation on the first movement information every reference time period (e.g., 5 ms). The reference time period may be 30 ms or less, but is not limited thereto. The electronic device may be worn on the middle knuckle of an index finger, thereby determining an angle and velocity at which the middle knuckle of the index finger has moved based on a joint between the first and middle knuckles of the index finger as an axis. In addition, the electronic device may be worn on the last knuckle of the index finger, thereby determining an angle and speed at which the last knuckle of the index finger has moved based on a joint between the first and middle knuckles of the index finger as an axis.

In step S500, the electronic device may determine whether a current mode is a mouse mode or a gesture mode. When the current mode is the mouse mode (Yes), the electronic device may acquire touch information in step S520, and determine a mouse signal based on at least one of the second movement information and the touch information in step S540.

When the current mode is the gesture mode (No), the electronic device may determine a motion signal corresponding to the movement of the object based on the acquired second movement information in step S600. According to one embodiment, the electronic device may determine a motion signal corresponding to the movement of the object. According to one embodiment, the electronic device may determine the motion based on the speed, angle, distance, and the like at which the index finger has moved. The motions may include a move, a tap, a grab, a scroll, a swipe, a gesture, and a rotation motion, but are not limited thereto. The motions may include gesture profiles (left/right, forward/backward, circle (clockwise/counterclockwise)) generated according to the user's characteristics. When the movement of an object does not correspond to any of motions predefined by the manufacturer or user-defined motions or is determined to be a meaningless movement, the electronic device may treat it as an exception without generating a motion signal.

In step S800, the electronic device may transmit a control signal indicating the determined motion signal or mouse signal to the host device through a wireless communication interface. The control signal may be an interrupt signal for controlling the host device. According to one embodiment, the electronic device may determine whether the position of the object is within a reference distance from the position where content is played, and transmit a control signal to the host device only when the position is within the reference distance as a result of the determination. This is because when the user is far away from the content, it is difficult to view the user's movement as a movement to control the content.

In step S900, the host device may control the content based on the received control signal. For example, when the received control signal is a move motion, the host device may move a baseball in a game in a direction, speed, and distance proportional to the movement of the object. The host device may select an item on the game when the received control signal is a tap motion. The host device may rotate a disc on the game when the received control signal is a rotation motion. The host device may zoom in or zoom out content depending on a distance between the object and the content when the received control signal is a move motion. The host device may turn a page of a Word document or presentation document when the received control signal is a page-turn motion (e.g., left move, right move). The host device may perform a click operation at a current mouse position when the received control signal is a mouse click. The host device may perform a scroll up operation when the received control signal is mouse scroll up.

Figure 9:
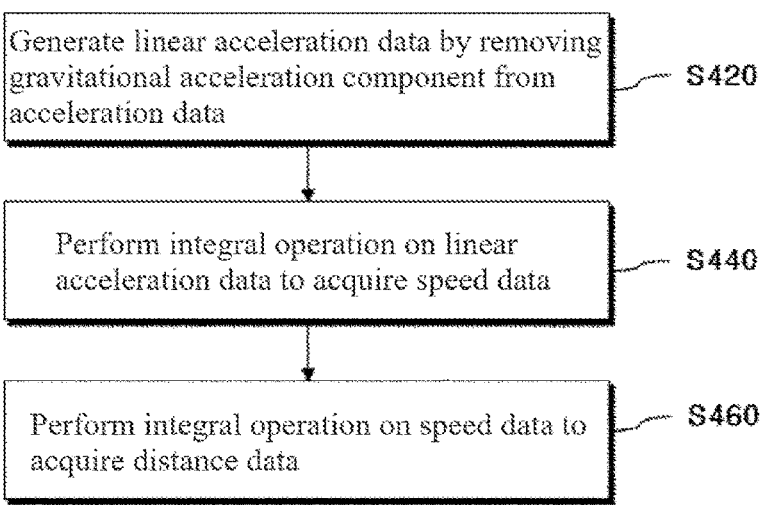
FIG. 9 shows a flowchart of a method for acquiring distance data, according to one embodiment.

FIG. 9 shows a flowchart of a method for acquiring, by an electronic device, distance data for the movement of an object, according to one embodiment.

In step S420, the electronic device may remove a gravitational acceleration component from acceleration data to generate linear acceleration data. Acceleration data for the movement of the object may be acquired by removing an influence due to the gravitational acceleration from the acceleration data.

In step S440, the electronic device may perform an integral operation on the linear acceleration data to acquire speed data.

In step S460, the electronic device may perform an integral operation on the speed data to acquire distance data.

Figure 10:
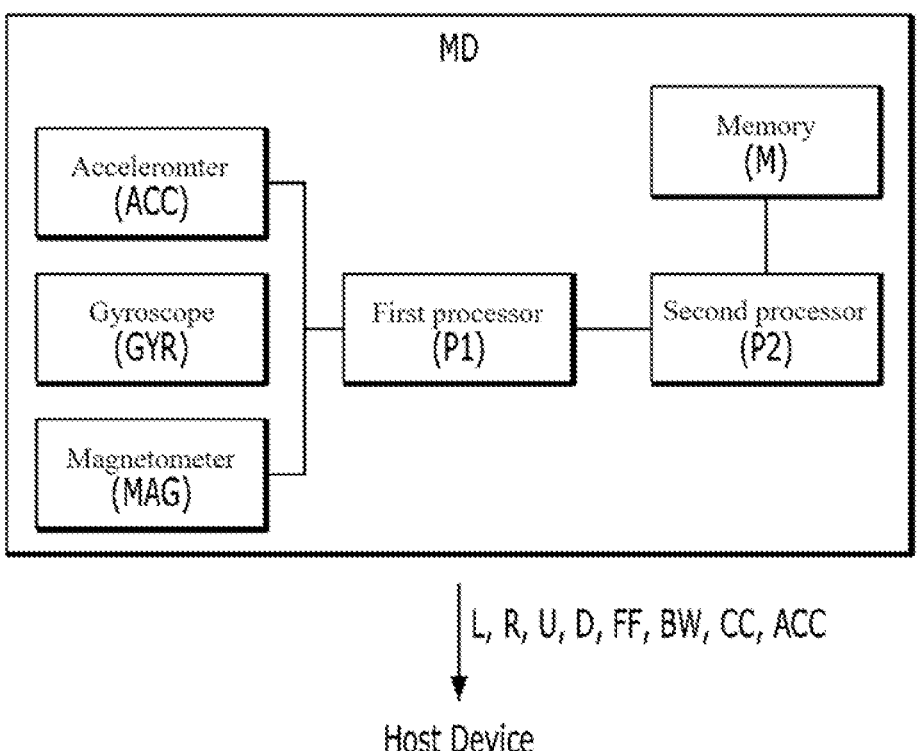
FIG. 10 shows a block diagram of an electronic device, according to one embodiment.

FIG. 10 shows a block diagram of an electronic device, according to one embodiment.

The electronic device MD of FIG. 10 may be the main module 1240 or the electronic device 3000 described above with reference to FIGS. 1A to 9. For example, the electronic device MD may be a ring-shaped device that can be worn on a finger. The electronic device MD may match a current user's motion to one of left move, right move, up move, down move, circle (clockwise, counterclockwise), and forward/back move in FIG. 7 and output a control signal corresponding to the matched motion. Referring to FIG. 10, the electronic device MD may include an accelerometer ACC, a gyroscope GYR, a magnetometer MAG, a first processor P1, a second processor P2, and a memory M.

The accelerometer ACC, the gyroscope GYR, and the magnetometer MAG are the same as the accelerometer 3220, the gyroscope 3240, and the magnetometer 3260 described above with reference to FIG. 3, and thus a detailed description thereof will be omitted.

The accelerometer ACC, the gyroscope GYR, and the magnetometer MAG may acquire acceleration data, angular velocity data, and geomagnetic data in real time from the movement of a user wearing the electronic device MD in his or her hand. The first processor P1 may acquire various motion data values processed based on raw data received from the accelerometer ACC, the gyroscope GYR, and the magnetometer MAG.

Figure 11:
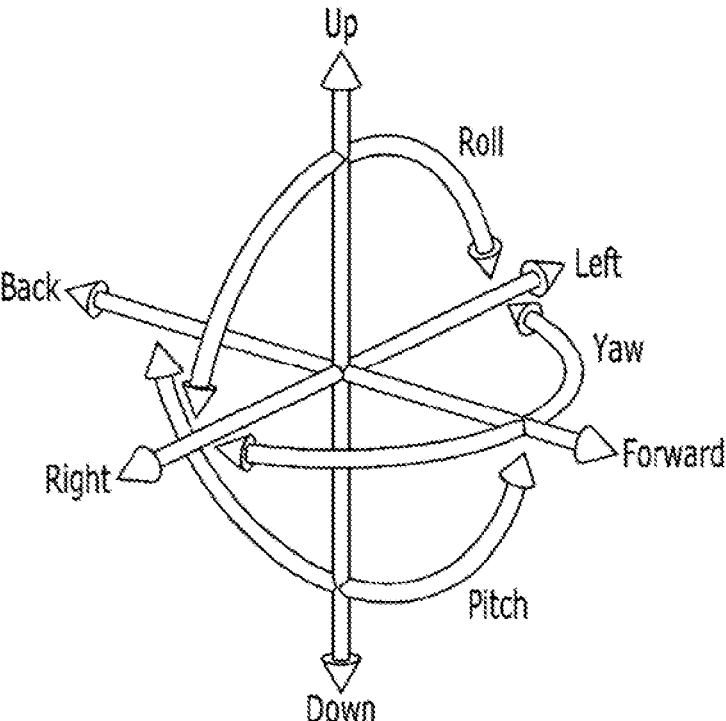
FIG. 11 shows nine axes on a three-dimensional space, according to one embodiment.

Referring to FIGS. 10 and 11 together, the first processor P1 may acquire acceleration values for three axes (left/right (X-axis), forward/back (Z-axis)), respectively, in real time based on acceleration data received from the accelerometer ACC. Hereinafter, acceleration may refer to linear acceleration obtained by removing a gravitational acceleration component from acceleration data received from the accelerometer ACC.

The first processor P1 may acquire angular velocity values for three axes (yaw, pitch, roll), respectively, in real time based on angular velocity data received from the gyroscope GYR.

The first processor P1 may acquire inclination values (hereinafter, an inclination value for a yaw axis, an inclination value for a pitch axis, and an inclination value for a roll axis) between the electronic device (MD) and the ground in real time for three axes (yaw, pitch, roll), respectively, based on acceleration data, angular velocity data, and geomagnetic data acquired from the accelerometer ACC, the gyroscope GYR, and the magnetometer MAG, respectively.

According to one embodiment, the second processor P2 may periodically or at regular time intervals (e.g., at 20 ms intervals) acquire acceleration for values three axes (left/right, forward/back, up/down), respectively, angular velocity values for three axes (yaw/pitch/roll), respectively, and inclination values for three axes (yaw/pitch/roll), respectively. For example, the second processor P2 may periodically or at regular time intervals (e.g., at 20 ms intervals) read acceleration values for three axes (left/right, forward/back, up/down), respectively, angular velocity values for three axes (yaw/pitch/roll), respectively, and inclination values for three axes (yaw/pitch/roll), respectively, from the first processor P1.

The second processor P2 may determine, in a first operation mode (referred to as a gesture recording mode), whether a user's current motion matches any one of reference motions based on motion data read at regular time intervals from the first processor P1, and generate the current user's gesture profile for the reference motions.

The second processor P2 may match a motion currently made by the user to a specific reference motion in a second operation mode (referred to as a gesture recognition mode). In a second operation mode, the second processor P2 may perform accurate matching reflecting the user's unique movement by comparing user characteristic values acquired from the motion made by the user with the user's previously recorded gesture profile. For a reference motion, as basic motions that are the bases of control signals provided by the electronic device MD, the reference motions may include move motions in left/right/up/down directions, move motions in forward/backward directions, or circle (clockwise/counterclockwise) motions.

In order to match a motion made by a user in the gesture recognition mode to one of the reference motions, references defined by the user for each of the reference motions may be referred to as a gesture profile. For example, a gesture profile may include references for eight reference motions (moves in left/right/up/down directions, moves in forward/backward directions, and circles (clockwise/counterclockwise)) (See FIG. 7). The gesture profile may be generated independently for each user. This is to reflect unique motion characteristics of each user.

Figure 13:
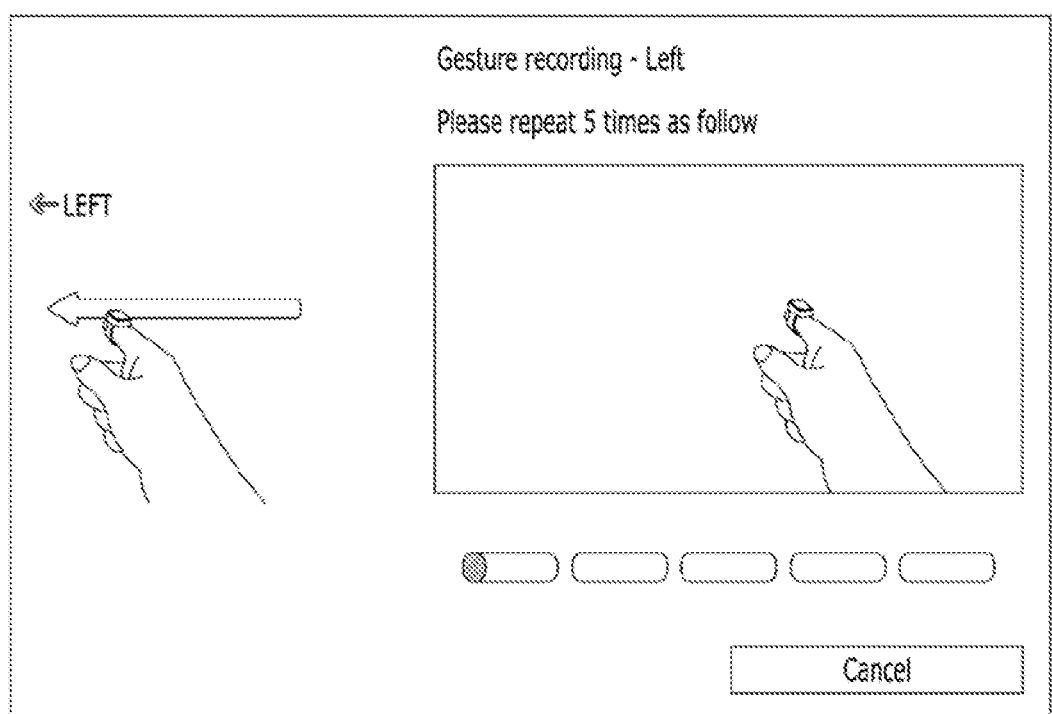
FIG. 13 shows a user making a specific reference motion (left move motion) according to a guide screen, according to one embodiment.

According to one embodiment, a guide screen may guide the user to repeatedly make at least one of left move, right move, up move, down move, forward move, backward move, clockwise circle, and counterclockwise circle. For example, the guide screen displays for the user to repeat the left move operation 5 times through the screen, and the user may follow the operation (referred to as a recording operation in the gesture recording mode). The electronic device MD may generate a gesture profile for at least one of the reference motions based on motion data acquired from the user's repeated motion and store it in the memory M. FIG. 13 shows a screen that guides a user to repeat a left move operation, according to one embodiment.

Under the gesture recording mode, the user may make a recording motion, and the electronic device MD may generate a gesture profile for at least one of the reference motions based on at least one of acceleration values for three axes (left/right, forward/back, up/down), respectively, angular velocity values for three axes (yaw/pitch/roll), respectively, and inclination values for three axes (yaw/pitch/roll), respectively, acquired from the recording motion, and store it in the memory M.

Under the gesture recognition mode, the user may make a recognition motion and the electronic device MD may match the recognition motion currently made by the user to one of the reference motions.

Figure 12:
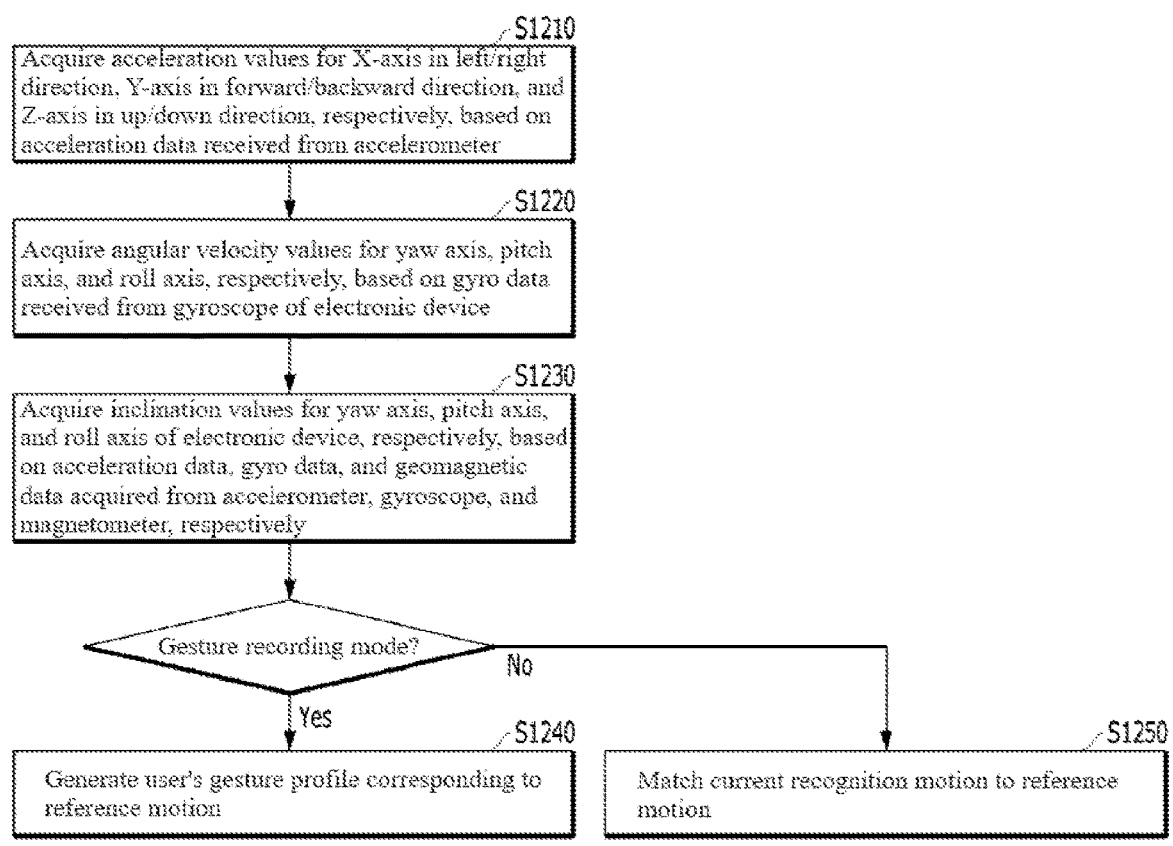
FIG. 12 shows a flowchart of a method for outputting a control signal based on a user's motion, according to one embodiment.

FIG. 12 shows a flowchart of a method for outputting a control signal based on a user's motion, according to one embodiment. FIG. 12 may be performed by the electronic device MD.

In step S1210, the electronic device may acquire accelerations for an X-axis in a left/right direction, a Y-axis in a forward/backward direction, and a Z-axis in an up/down direction, respectively, at regular time intervals based on acceleration data received from the accelerometer.

In step S1220, the electronic device may acquire angular velocities for a yaw axis, a pitch axis, and a roll axis, respectively, at regular time intervals based on gyro data received from the gyroscope of the electronic device.

In step S1230, inclinations for the yaw axis, the pitch axis, and the roll axis of the electronic device, respectively, may be acquired at regular time intervals based on acceleration data, gyro data, and geomagnetic data acquired from the accelerometer, the gyroscope, and the magnetometer, respectively.

The operations in steps S1210 to S1230 are similar to those of the second processor P2 described above with reference to FIG. 10, and thus a detailed description thereof will be omitted.

When a current mode is a gesture recording mode, in step S1240, the electronic device may generate a user's gesture profile corresponding to a reference motion by having the user make a recording motion that follows the reference motion at least once.

When the current mode is a gesture recognition mode, in step S1250, it may be determined whether the user's recognition motion (currently made motion) matches the reference motion.

FIG. 14 shows a flow diagram of a method performed on an electronic device in a gesture recording mode or gesture recognition mode for a left, right, up, or down move motion, according to one embodiment. The flowchart of the method in FIG. 14 may be performed by the electronic device MD or the second processor P2 of the electronic device MD.

The flowchart of FIG. 14 may be sub-steps of step S1240 or S1250 in FIG. 12. For example, step S1240 in FIG. 12 may include steps S1410 to S1480 in FIG. 14. Step S1250 in FIG. 12 may include steps S1410 to S1490 in FIG. 14.

The electronic device MD may acquire the user's motion data periodically or at regular time intervals. According to one embodiment, the second processor P2 may acquire acceleration values for three axes (left/right, forward/back, up/down), respectively, angular velocity values for three axes (yaw/pitch/roll), respectively, and inclination values for three axes (yaw/pitch/roll), respectively, from the first processor P1 at 20 ms intervals. In the flowchart of FIG. 14, acceleration values for three axes (left/right, forward/back, up/down), respectively, angular velocity values for three axes (yaw/pitch/roll), respectively, and inclination values for three axes (yaw/pitch/roll), respectively, may refer to values periodically read by the second processor P2 from the first processor P1.

Returning, by the electronic device MD, to a standby state denotes determining, by the electronic device MD, when any one of various conditions judged to finally determine that a user has made a specific reference motion is out of the condition, that a motion currently made by the user is not a meaningful gesture, ending a gesture profile generation operation (in a gesture recording mode) or gesture recognition operation (in a gesture recognition mode), which is currently being performed, and returning to an idle state (reset).

Referring to FIG. 14, regardless of the operation mode, steps up to step S1460 are the same. Therefore, a 'motion' made by a user up to step S1460 may be referred to as a 'recording motion' for generating a gesture profile when the operation mode is a gesture recording mode, and may be referred to as a 'recognition motion' for the electronic device to actually output a control signal to the outside when the operation mode is a gesture recognition mode, but this is only a difference in terminology to refer to the motion in each mode.

In step S1410, the electronic device may determine whether the user is ready to make a motion based on at least one of an inclination with respect to the roll axis or an inclination with respect to the pitch axis. For example, when the inclination with respect to the pitch axis is within a first reference range and the inclination with respect to the roll axis is within a second reference range, it may be determined (Yes) that the user is ready to make a left move motion. When an inclination value with respect to the roll axis is within a third reference range, it may be determined (Yes) that the user is ready to make a right move. When an inclination value with respect to the roll axis is within a third reference range, it may be determined (Yes) that the user is ready to make an up move. When an inclination value with respect to the roll axis is within a fourth reference range, it may be determined (Yes) that the user is ready to make an up move. When an inclination value with respect to the roll axis is within a fifth reference range, it may be determined (Yes) that the user is ready to make a down move. When it is not ready to make any motion (No), it returns to a standby state. In step S1410, the reference range of the inclination with respect to the roll axis or the inclination with respect to the pitch axis for determining the readiness of a motion may be independently set for left move, right move, up move, and down move, respectively.

In step S1420, the electronic device may determine whether a motion has started. For example, the electronic device may determine that a left move motion has started when an angular velocity with respect to the yaw axis is above a first reference value. The electronic device MD may determine that a right move motion has started when an angular velocity with respect to the pitch axis is above a second reference value. The electronic device MD may determine that an up move motion has started when an angular velocity with respect to the yaw axis is above a third reference value. The electronic device MD may determine that a down move motion has started when an angular velocity with respect to the yaw axis is above a fourth reference value. In step S1420, reference values for determining motion start may be independently set for left move, right move, up move, and down move, respectively. When it is determined that no motion has started (No), it returns to a standby mode.

In step S1430, the electronic device may determine whether an inclination while making a motion is within a reference range. For example, the electronic device may determine whether the inclination is within a reference range based on at least one of the inclination with respect to the pitch axis and the inclination with respect to the roll axis. For example, when an inclination of the pitch axis is out of a sixth reference range or an inclination of the roll axis is out of a seventh reference range while making a motion, the electronic device determines that it is not a left move motion (No) and returns to a standby state. When an inclination of the roll axis is out of an eighth reference range while making a motion, the electronic device MD determines that it is not a right move motion (No) and returns to a standby state. When an inclination of the roll axis is out of a ninth reference range while making a motion, the electronic device MD determines that it is not an up move motion (No) and returns to a standby state. When an inclination of the roll axis is below a fifth reference value or an absolute value of an inclination of the pitch axis is above a sixth reference value and the inclination of the roll axis is below a seventh reference value while making a motion, the electronic device MD determines that it is not a down move motion (No) and returns to a standby state. In step S1430, the sixth reference range, the seventh reference range, the eighth reference range, and the ninth reference range may be set independently of one another.

In step S1450, the electronic device may determine whether an angular velocity at a completion time of the motion is above a reference value. For example, the electronic device returns to a standby state when an angular velocity of the yaw axis at the completion time of the motion is below an eighth reference value. Alternatively, the electronic device returns to a standby state when an angular velocity of the pitch axis at the completion time of the motion is below a ninth reference value. In step S1450, the eighth reference value and the ninth reference value may be set independently of each other. The electronic device may determine a completion time of the motion based on at least one of an angular velocity with respect to the yaw axis and an angular velocity with respect to the pitch axis. For example, a time when a current angular velocity value with respect to the yaw axis becomes below a reference rate than a maximum value of the angular velocity with respect to the yaw axis after the start of the motion (step S1420) may be determined as a time when a left move, an up move, or a down move motion is completed. For example, a time when a current angular velocity value with respect to the pitch axis becomes below a reference rate than a maximum value of the angular velocity with respect to the pitch axis after the start of the motion (step S1420) may be determined as a time when a right move motion is completed.

In step S1460, the electronic device may determine whether an accumulated value of acceleration values acquired from a start time (step S1420) to a completion time of the motion is above the reference value. This is to infer a magnitude of the user's motion, thereby determining it as a valid motion only when the magnitude of the motion is above the reference value even if the motion has satisfied all previous conditions. For example, the electronic device may determine that a left move motion up to the present is valid only when an accumulated value of acceleration values in an X-axis direction is above a tenth reference value. The electronic device may determine that a right move motion up to the present is valid only when a cumulative value of acceleration values in a Z-axis direction is above an eleventh reference value. The electronic device may determine that an up move motion up to the present is valid only when an accumulated value of acceleration values in an X-axis direction is above a twelfth reference value. The electronic device may determine that a down move motion up to the present is valid only when an accumulated value of acceleration values in an X-axis direction is above a thirteenth reference value. In step S1460, the tenth reference range, the eleventh reference range, the twelfth reference range, and the thirteenth reference range may be set independently of one another. When the motion is determined to be invalid (No), the electronic device returns to a standby state.

The gesture recording mode is a mode that generates a gesture profile to be used for gesture recognition when a user's current motion matches a specific reference motion, and the gesture recognition mode is a mode that performs final gesture recognition reflecting the user's unique characteristics through additionally using a previously generated gesture profile when the user's current motion matches a specific reference motion. When a current operation mode is a gesture recording mode (Yes), step S1480 is carried out, and when the current operation mode is a gesture recognition mode (No), step S1490 is carried out.

In step S1480, the electronic device may acquire user characteristic values unique to a user currently making a motion based on motion data acquired from the start of a recording motion to the completion thereof and store them in the memory. The electronic device may acquire at least one user characteristic value for each of left move, right move, up move, and down move. For example, even if users make a motion while watching the same guide video (a left move as shown in FIG. 13), data acquired for respective users may not be the same, and therefore, this it to reflect respective users' unique characteristics in the gesture profile. The electronic device may increase a gesture recognition rate by acquiring and storing a current user characteristic value in the gesture recording mode and later comparing a user characteristic value acquired from the user in the gesture recognition mode with the previously stored user characteristic value.

For example, in the gesture recording mode, a user characteristic value acquired by a left move motion made by a first user may be different from a user characteristic value acquired by a left move motion made by a second user. For example, a reference rotation amount, which is a value obtained by dividing a maximum value among angular velocity values with respect to the roll axis acquired from the start of the first user's left move motion to the completion thereof by a maximum value among angular velocity values with respect to the yaw axis, may be stored in the memory as a user characteristic value for the first user's left move motion. A reference interference amount, which is a value obtained by dividing a maximum value among angular velocity values with respect to the pitch axis from the start to the completion of the first user's left move motion by a maximum value among angular velocity values with respect to the yaw axis, may be stored in the memory as a user characteristic value for the first user's left move.

For example, in the gesture recording mode, a user characteristic value acquired by a right move motion made by a first user may be different from a user characteristic value acquired by a right move motion made by a second user. For example, a reference rotation amount, which is a value obtained by dividing a maximum value among angular velocity values with respect to the roll axis acquired from the start of the first user's right move motion to the completion thereof by a maximum value among angular velocity values with respect to the pitch axis, may be stored in the memory as a user characteristic value for the first user's right move. A reference interference amount, which is a value obtained by dividing a maximum value among angular velocity values with respect to the yaw axis from the start to the completion of the first user's right move motion by a maximum value among angular velocity values with respect to the pitch axis, may be stored in the memory as a user characteristic value for the first user's right move.

For example, in the gesture recording mode, a user characteristic value acquired by an up move motion made by a first user may be different from a user characteristic value acquired by an up move motion made by a second user. For example, a reference rotation amount, which is a value obtained by dividing a maximum value among angular velocity values with respect to the roll axis acquired from the start of the first user's up move motion to the completion thereof by a maximum value among angular velocity values with respect to the yaw axis, may be stored in the memory as a user characteristic value for the first user's up move. A reference interference amount, which is a value obtained by dividing a maximum value among angular velocity values with respect to the pitch axis from the start to the completion of the first user's up move motion by a maximum value among angular velocity values with respect to the yaw axis, may be stored in the memory as a user characteristic value for the first user's up move.

For example, in the gesture recording mode, a user characteristic value acquired by a down move motion made by a first user may be different from a user characteristic value acquired by a down move motion made by a second user. For example, a reference rotation amount, which is a value obtained by dividing a maximum value among angular velocity values with respect to the roll axis acquired from the start of the first user's down move motion to the completion thereof by a maximum value among angular velocity values with respect to the yaw axis, may be stored in the memory as a user characteristic value for the first user's down move. A reference interference amount, which is a value obtained by dividing a maximum value among angular velocity values with respect to the pitch axis from the start to the completion of the first user's down move motion by a maximum value among angular velocity values with respect to the yaw axis, may be stored in the memory as a user characteristic value for the first user's down move.

In the gesture recording mode, a user may repeatedly make one recording motion a number times, thereby generating a gesture profile. According to one embodiment, steps S1410 to S1480 may be performed a number of times (e.g., 5 times) and a user characteristic value may be determined based on reference rotation amount and reference interference amount values acquired each time. When steps S1410 to S1480 are all performed, it may be regarded as one recording count. For example, average, minimum, maximum, and intermediate values of reference rotation amounts and reference interference amounts acquired over a plurality of times may be stored in the memory as a final reference rotation amount and a final reference interference amount.

A rotation amount refers to a degree to which the user's wrist twists when making a left, right, up, or down movement motion, and an interference amount refers to a degree of movement on an axis other than a main axis of movement.

The rotation amount and the interference amount may vary for each user, and thus may be used as a user characteristic value.

In step S1490, when a current operation mode is not a gesture recording mode (No), that is, when it is a gesture recognition mode, the user characteristic value currently acquired from a motion made by the user may be compared with a pre-stored user characteristic value. When a current user is a first user, the electronic device may compare the rotation amount and the interference amount acquired from the first user's recognition motion with the pre-stored reference rotation amount and reference interference amount of the first user, respectively. When the current user is a second user, the electronic device may compare the rotation amount and the interference amount acquired from the second user's recognition motion with the pre-stored reference rotation amount and reference interference amount of the second user, respectively.

Based on a result of the comparison, it may be determined whether the recognition motion and the reference motion are matched to each other. When a currently acquired rotation amount is within a predetermined error range from the reference rotation amount, and a currently acquired interference amount is within a predetermined error range from the reference interference amount, the recognition motion may be matched to (recognized as) left move, right move, up move, or down move.

Hereinafter, the gesture recording method and gesture recognition method of the left move motion will be described in detail with reference to FIG. 15.

Figure 15:
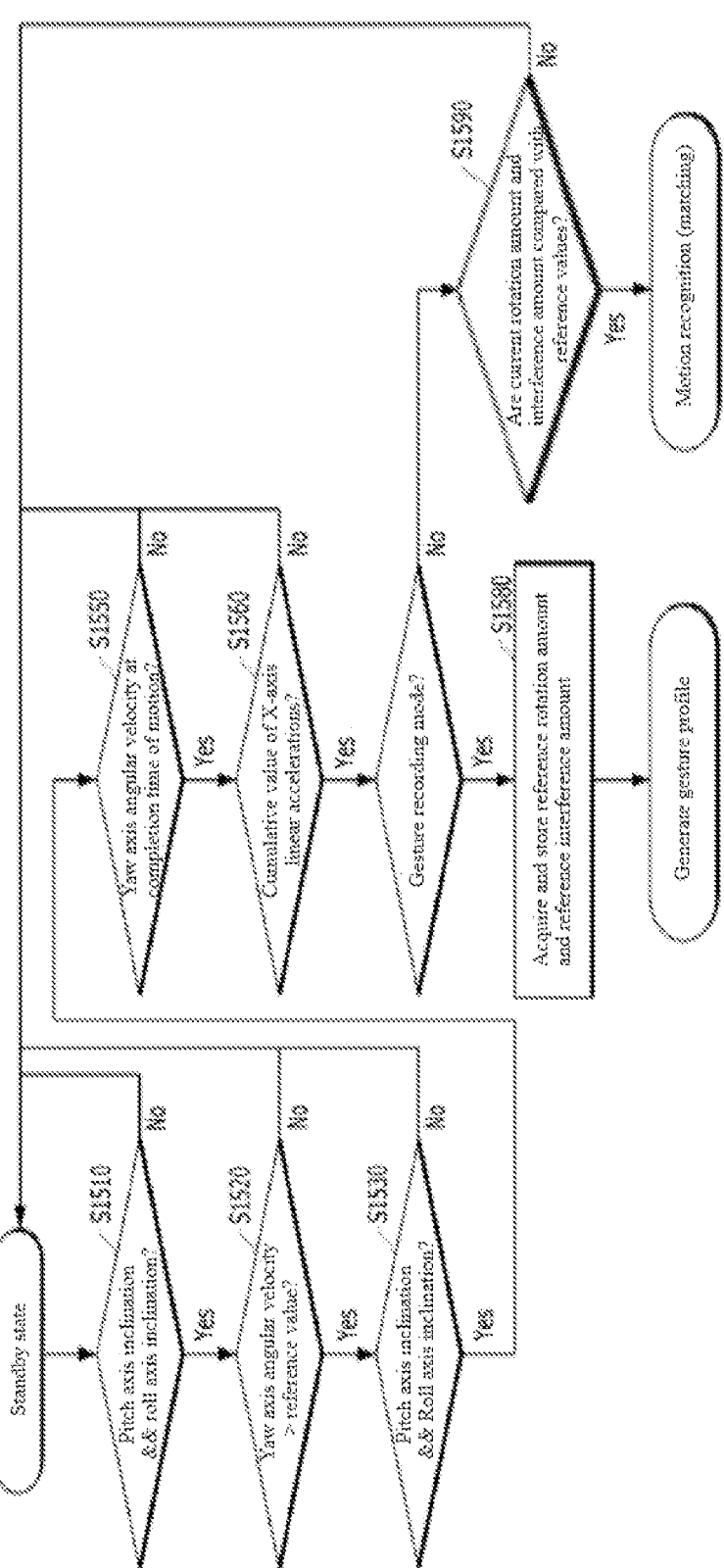
FIG. 15 shows a flowchart of a method performed in a gesture recording mode or gesture recognition mode for a left move motion, according to one embodiment.

A flowchart in FIG. 15 is one embodiment of a flowchart in FIG. 14. Steps S1510, S1520, S1530, S1550, S1560, S1580, and S1590 in FIG. 15 may be performed in steps S1410, S1420, S1430, S1450, S1460, S1480, and S1490 in FIG. 14, respectively. Hereinafter, reference values or reference ranges mentioned herein are acquired through repeated experiments, and embodiments of the present disclosure are not restrictively interpreted as reference values or reference ranges below.

In the determining of the readiness of a motion (S1510), the electronic device determines, when an inclination with respect to the pitch axis is greater than or equal to −30° and is less than or equal to +30° and an inclination with respect to the roll axis is greater than or equal to −25° and is less than or equal to +35° (Yes), that it is ready for a left move motion, and otherwise (No), it returns to a standby state.

In the determining of the start of a motion (S1520), the electronic device determines, when an angular velocity with respect to the yaw axis is above 183 degrees/sec (Yes), that a left move motion has started, and otherwise (No), it returns to a standby state.

In the determining of the inclination condition of a motion (S1530), the electronic device determines that a left move motion is continuing only when an inclination with respect to the pitch axis is greater than or equal to −90° and less than or equal to +90°. In addition, the electronic device determines that a left move motion is continuing only when an inclination with respect to the roll axis is greater than or equal to −60° and less than or equal to +90°. Accordingly, the electronic device returns to a standby state when an inclination with respect to the pitch axis is less than −90° or greater than +90°. Alternatively, the electronic device returns to a standby state when an inclination with respect to the roll axis is less than −60° or greater than +90°.

In the determining of an angular velocity at the completion time of a motion (S1550), the electronic device may determine that a left move motion is completed only when an angular velocity with respect to the yaw axis is above 305 degrees/sec. A time when a current angular velocity value with respect to the yaw axis becomes below a reference rate (e.g., 30%) than a maximum value of the angular velocity with respect to the yaw axis after the start of the motion (step S1510) may be determined as a time when a left move motion is completed.

In the determining of whether a motion is valid (S1560), the electronic device may determine that a left move motion is valid only when a cumulative value of acceleration values in an X-axis direction is above 4.88 m/s$^2$.

Steps S1580 and S1590 are the same as the description of the left move motion in steps S1480 and S1490 described above with reference to FIG. 14, and thus a description thereof will be omitted. According to one embodiment, a tolerance range for a rotation amount in step S1590 may be below ±1.5 times the reference rotation amount, and a tolerance range for an interference amount may be +0.6 times the reference interference amount, but is not limited thereto.

Hereinafter, the gesture recording method and gesture recognition method of the right move motion will be described in detail with reference to FIG. 16 again.

Figure 16:
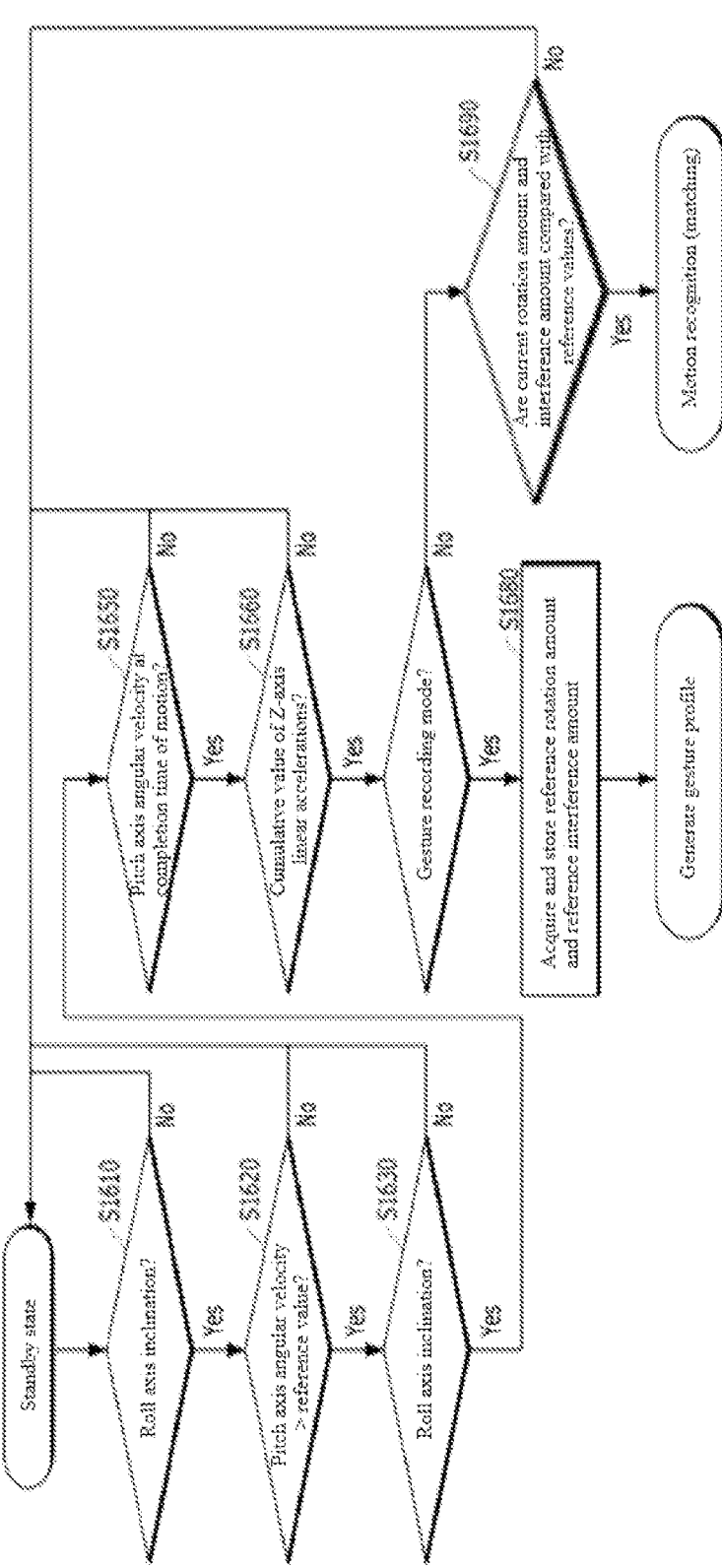
FIG. 16 shows a flowchart of a method performed in a gesture recording mode or gesture recognition mode for a right move motion, according to one embodiment.

A flowchart in FIG. 16 is one embodiment of a flowchart in FIG. 14. Steps S1610, S1620, S1630, S1650, S1660, S1680, and S1690 in FIG. 16 may be performed in steps S1410, S1420, S1430, S1450, S1460, S1480, and S1490 in FIG. 14, respectively. Hereinafter, reference values or reference ranges mentioned herein are acquired through repeated experiments, and embodiments of the present disclosure are not restrictively interpreted as reference values or reference ranges below.

In the determining of the readiness of a motion (S1610), the electronic device determines, when an inclination with respect to the roll axis is greater than or equal to 0° and is less than or equal to 90° (Yes), that it is ready for a right move motion, and otherwise (No), it returns to a standby state.

In the determining of the start of a motion (S1620), the electronic device determines, when an angular velocity with respect to the pitch axis is above 12 degrees/sec (Yes), that a right move motion has started, and otherwise (No), it returns to a standby state.

In the determining of the inclination condition of a motion (S1630), the electronic device determines that a right move motion is continuing only when an inclination with respect to the roll axis is greater than or equal to −20° and less than or equal to +90°. Accordingly, the electronic device returns to a standby state when an inclination with respect to the roll axis is less than −20° or greater than +90°.

In the determining of an angular velocity at the completion time of a motion (S1650), the electronic device may determine that a right move motion is completed only when an angular velocity with respect to the pitch axis is above 20 degrees/sec. A time when a current angular velocity value with respect to the pitch axis becomes below a reference rate (e.g., 30%) than a maximum value of the angular velocity with respect to the pitch axis after the start of the motion (step S1610) may be determined as a time when a right move motion is completed.

In the determining of whether a motion is valid (S1660), the electronic device may determine that a right move motion is valid only when a cumulative value of acceleration values in a Z-axis direction is above 2.44 m/s$^2$.

Steps S1680 and S1690 are the same as the description of the right move motion in steps S1480 and S1490 described above with reference to FIG. 14, and thus a description thereof will be omitted. According to one embodiment, a tolerance range for a rotation amount in step S1690 may be below ±1.5 times the reference rotation amount, and a tolerance range for an interference amount may be above-1 times and below ±0.8 times the reference interference amount, but is not limited thereto.

Hereinafter, the gesture recording method and gesture recognition method of the up move motion will be described in detail with reference to FIG. 17.

A flowchart in FIG. 17 is one embodiment of a flowchart in FIG. 14. Steps S1710, S1720, S1730, S1750, S1760, S1780, and S1790 in FIG. 17 may be performed in steps S1410, S1420, S1430, S1450, S1460, S1480, and S1490 in FIG. 14, respectively. Hereinafter, reference values or reference ranges mentioned herein are acquired through repeated experiments, and embodiments of the present disclosure are not restrictively interpreted as reference values or reference ranges below.

In the determining of the readiness of a motion (S1710), the electronic device determines, when an inclination with respect to the roll axis is greater than or equal to −90° and is less than or equal to −15° (Yes), that it is ready for an up move motion, and otherwise (No), it returns to a standby state.

In the determining of the start of a motion (S1720), the electronic device determines, when an angular velocity with respect to the yaw axis is above 12 degrees/sec (Yes), that an up move motion has started, and otherwise (No), it returns to a standby state.

In the determining of the inclination condition of a motion (S1730), the electronic device determines that an up move motion is continuing only when an inclination with respect to the roll axis is less than or equal to +30°. Accordingly, the electronic device returns to a standby state when an inclination with respect to the roll axis is greater than +30°.

In the determining of an angular velocity at the completion time of a motion (S1750), the electronic device may determine that an up move motion is completed only when an angular velocity with respect to the yaw axis is above 23 degrees/sec. A time when a current angular velocity value with respect to the yaw axis becomes below a reference rate (e.g., 30%) than a maximum value of the angular velocity with respect to the yaw axis after the start of the motion (step S1710) may be determined as a time when an up move motion is completed.

In the determining of whether a motion is valid (S1760), the electronic device may determine that an up move motion is valid only when a cumulative value of acceleration values in an X-axis direction is above 0.92 m/s$^2$.

Steps S1780 and S1790 are the same as the description of the up move motion in steps S1480 and S1490 described above with reference to FIG. 14, and thus a description thereof will be omitted. According to one embodiment, a tolerance range for a rotation amount in step S1790 may be below ±1.3 times the reference rotation amount, and a tolerance range for an interference amount may be below ±0.6 times the reference interference amount, but is not limited thereto.

Hereinafter, the gesture recording method and gesture recognition method of the down move motion will be described in detail with reference to FIG. 17.

Figure 18:
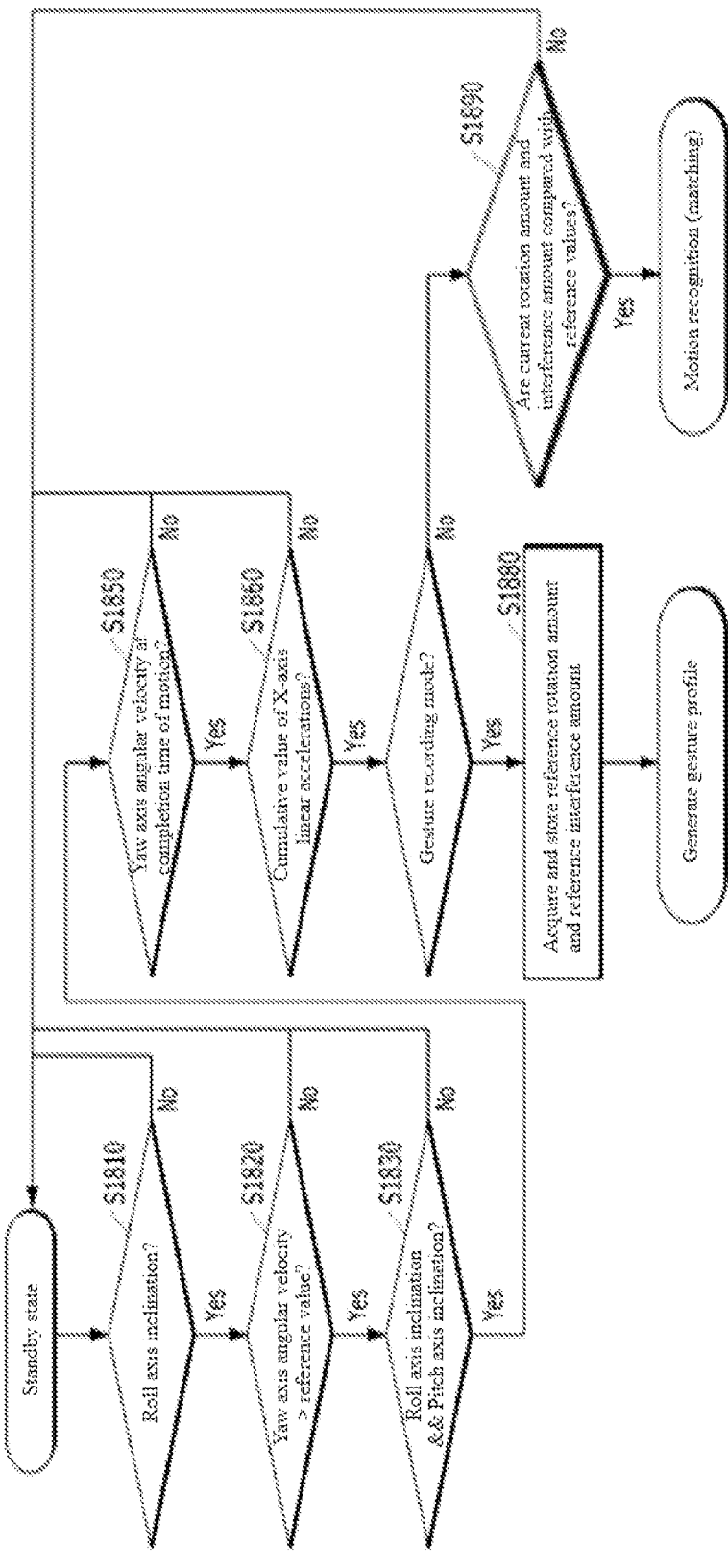
FIG. 18 shows a flowchart of a method performed in a gesture recording mode or gesture recognition mode for a down move motion, according to one embodiment.

A flowchart in FIG. 18 is one embodiment of a flowchart in FIG. 14. Steps S1810, S1820, S1830, S1850, S1860, S1880, and S1890 in FIG. 18 may be performed in steps S1410, S1420, S1430, S1450, S1460, S1480, and S1490 in FIG. 14, respectively. Hereinafter, reference values or reference ranges mentioned herein are acquired through repeated experiments, and embodiments of the present disclosure are not restrictively interpreted as reference values or reference ranges below.

In the determining of the readiness of a motion (S1810), the electronic device determines, when an inclination with respect to the roll axis is greater than or equal to 10° and is less than or equal to +90° (Yes), that it is ready for a down move motion, and otherwise (No), it returns to a standby state.

In the determining of the start of a motion (S1820), the electronic device determines, when an angular velocity with respect to the yaw axis is above 12 degrees/sec (Yes), that a down move motion has started, and otherwise (No), it returns to a standby state.

In the determining of the inclination condition of a motion (S1830), the electronic device returns to a standby state when an inclination with respect to the roll axis is below −30°, or an absolute value of the inclination with respect to the pitch axis is above 120° and an inclination with respect to the roll axis is below 30° (No). Otherwise (Yes), the method proceeds to step S1850.

In the determining of an angular velocity at the completion time of a motion (S1850), the electronic device may determine that a down move motion is completed only when an angular velocity with respect to the yaw axis is above 23 degrees/sec. A time when a current angular velocity value with respect to the yaw axis becomes below a reference rate (e.g., 30%) than a maximum value of the angular velocity with respect to the yaw axis after the start of the motion (step S1810) may be determined as a time when an up move motion is completed.

In the determining of whether a motion is valid (S1860), the electronic device may determine that a down move motion is valid only when a cumulative value of acceleration values in an X-axis direction is above 0.92 m/s$^2$.

Steps S1880 and S1890 are the same as the description of the down move motion in steps S1480 and S1490 described above with reference to FIG. 14, and thus a description thereof will be omitted. According to one embodiment, a tolerance range for a rotation amount in step S1890 may be below ±1.3 times the reference rotation amount, and a tolerance range for an interference amount may be below ±0.6 times the reference interference amount, but is not limited thereto.

Meanwhile, the above-described methods may be implemented as computer-readable codes on a computer-readable recording medium. The computer-readable recording medium may include any type of recording device in which data readable by a computer system is stored. Examples of the computer-readable recording medium include a ROM, a RAM, a CD-ROM, a magnetic tape, a floppy disk, an optical data storage device, and the like. In addition, the computer-readable recording medium may be distributed over computer systems connected via a network, and stored and executed as processor-readable codes in a distributed manner.

The above descriptions are intended to provide illustrative configurations and operations for implementing the present disclosure. The technical concept of the present disclosure will include not only the above-described embodiments, but also implementations that can be obtained by simply changing or modifying the above embodiments. In addition, the technical concept of the present disclosure will also include implementations that can be easily achieved by changing or modifying the above-described embodiments in the future.

The invention claimed is:

1. A method for outputting a control signal based on a user's left move motion in an electronic device, the method comprising:

acquiring acceleration values for an X-axis in a left-right direction, a Y-axis in an up-down direction, and a Z-axis in a front-rear direction, respectively, based on acceleration data received from an accelerometer of the electronic device;

acquiring angular velocity values for a yaw axis, a pitch axis, and a roll axis, respectively, based on gyro data received from a gyroscope of the electronic device;

acquiring inclination values for a yaw axis, a pitch axis, and a roll axis, respectively, based on acceleration data, gyro data, and geomagnetic data acquired from the accelerometer, the gyroscope, the magnetometer of the electronic device, respectively;

generating, when a current operation mode is a gesture recording mode, the user' gesture profile corresponding to a reference motion by making a recording motion in which the user makes the reference motion at least once; and determining, when the current operation mode is a gesture recognition mode, whether the user's recognition motion matches the reference motion, wherein the reference motion is a left move, wherein the generating of the user's gesture profile comprises:

a first step of determining, when an inclination with respect to the pitch axis of the electronic device is within a first reference range and an inclination with respect to the roll axis is within a second reference range, that the recording motion is ready;

a second step of determining, when the recording motion is ready, that the recording motion has started when an angular velocity with respect to the yaw axis is above a first reference value;

a third step of ending, when the recording motion is started, the generation of the gesture profile and returning to a standby state when the inclination with respect to the roll axis of the recording motion is out of a third reference range or the inclination with respect to the pitch axis is out of a fourth reference range;

a fourth step of ending, when an angular velocity with respect to the yaw axis at a completion time of the recording motion is below a second reference value, the generation of the gesture profile and returning to the standby state;

a fifth step of determining, when a cumulative value of linear acceleration velocity with respect to the X-axis from a start time to a completion time of the recording motion is below a third reference value, that the recording motion is invalid to end the generation of the gesture profile to return to the standby mode; and a sixth step of storing a reference rotation amount, which is a value obtained by dividing a maximum angular velocity with respect to the roll axis from the start time to the completion time of the recording motion by a maximum angular velocity with respect to the yaw axis, and a reference interference amount, which is a value obtained by dividing a maximum angular velocity with respect to the pitch axis from the start time to the completion time of the recording motion by a maximum angular velocity with respect to the yaw axis, in a memory as the user's characteristic values, and wherein the completion time of the recording motion is determined as a time when a current angular velocity value with respect to the yaw axis becomes below a reference ratio of the maximum angular velocity with respect to the yaw axis after the start time of the recording motion.

2. The method of claim 1, wherein the user's gesture profile is generated by the user making the recording motion a number of times, wherein each number is counted only when all operations from the first step to the sixth step are completed, wherein the reference rotation amount is determined based on reference rotation amounts acquired over a number of times, respectively, and wherein the reference interference amount is determined based on reference interference amounts acquired over a number of times, respectively.

3. The method of claim 1, wherein the determining of whether the user's recognition motion matches the reference motion comprises:

a seventh step of determining, when an inclination with respect to the pitch axis of the electronic device is within the first reference range and an inclination with respect to the roll axis is within the second reference range, that the recognition motion is ready;

an eighth step of determining, when the recognition motion is ready, that the recognition motion has started when an angular velocity with respect to the yaw axis is above the first reference value;

a ninth step of ending, when the recognition motion is started, recognition and returning to a standby state when the inclination with respect to the roll axis of the recording motion is out of the third reference range or the inclination with respect to the pitch axis is out of the fourth reference range;

a tenth step of ending, when an angular velocity with respect to the yaw axis at a completion time of the recognition motion is below the second reference value, recognition and returning to the standby state;

an eleventh step of determining, when a cumulative value of linear acceleration velocity with respect to the X-axis from a start time to a completion time of the recognition motion is below the third reference value, that the recognition motion is invalid to end recognition to return to the standby mode; and a twelfth step of comparing a current rotation amount, which is a value obtained by dividing a maximum angular velocity with respect to the roll axis from the start time to the completion time of the recognition motion by a maximum angular velocity with respect to the yaw axis, and a current interference amount, which is a value obtained by dividing a maximum angular velocity with respect to the pitch axis from the start time to the completion time of the recognition motion by a maximum angular velocity with respect to the yaw axis, with the reference rotation amount and the reference interference amount previously stored in the memory, respectively, wherein whether the recognition motion matches the reference motion is determined based on the comparison result, and wherein the completion time of the recognition motion is determined as a time when a current angular velocity value with respect to the yaw axis becomes below a reference ratio of the maximum angular velocity with respect to the yaw axis after the start time of the recognition motion.

4. A method for outputting a control signal based on a user's right move motion in an electronic device, the method comprising:

acquiring acceleration values for an X-axis in a left-right direction, a Y-axis in an up-down direction, and a Z-axis in a front-rear direction, respectively, based on acceleration data received from an accelerometer of the electronic device;

acquiring angular velocity values for a yaw axis, a pitch axis, and a roll axis, respectively, based on gyro data received from a gyroscope of the electronic device;

acquiring inclination values for a yaw axis, a pitch axis, and a roll axis, respectively, based on acceleration data, gyro data, and geomagnetic data acquired from the accelerometer, the gyroscope, and the magnetometer of the electronic device, respectively;

generating, when a current operation mode is a gesture recording mode, the user' gesture profile corresponding to a reference motion by making a recording motion in which the user makes the reference motion at least once; and determining, when the current operation mode is a gesture recognition mode, whether the user's recognition motion matches the reference motion, wherein the reference motion is a right move, wherein the generating of the user's gesture profile comprises:

a first step of determining, when an inclination value with respect to the roll axis of the electronic device is within a first reference range, that the recording motion is ready;

a second step of determining, when the recording motion is ready, that the recording motion has started when an angular velocity with respect to the pitch axis is above a first reference value;

a third step of ending, when the recording motion is started, the generation of the gesture profile and returning to a standby state when the inclination with respect to the roll axis of the recording motion is out of a second reference range;

a fourth step of ending, when an angular velocity with respect to the pitch axis at a completion time of the recording motion is below a second reference value, the generation of the gesture profile and returning to the standby state;

a fifth step of determining, when a cumulative value of linear acceleration velocity with respect to the Z-axis from a start time to a completion time of the recording motion is below a third reference value, that the recording motion is invalid to end the generation of the gesture profile to return to the standby mode; and a sixth step of storing a reference rotation amount, which is a value obtained by dividing a maximum angular velocity with respect to the roll axis from the start time to the completion time of the recording motion by a maximum angular velocity with respect to the pitch axis, and a reference interference amount, which is a value obtained by dividing a maximum angular velocity with respect to the yaw axis from the start time to the completion time of the recording motion by a maximum angular velocity with respect to the pitch axis, in a memory as the user's characteristic values, and wherein the completion time of the recording motion is determined as a time when a current angular velocity value with respect to the pitch axis becomes below a reference ratio of the maximum angular velocity with respect to the pitch axis after the start time of the recording motion.

5. The method of claim 4, wherein the user's gesture profile is generated by the user making the recording motion a number of times, wherein each number is counted only when all operations from the first step to the sixth step are completed, wherein the reference rotation amount is determined based on reference rotation amounts acquired over a number of times, respectively, and wherein the reference interference amount is determined based on reference interference amounts acquired over a number of times, respectively.

6. The method of claim 4, wherein the determining of whether the user's recognition motion matches the reference motion comprises:

a seventh step of determining, when an inclination value with respect to the roll axis of the electronic device is within the first reference range, that the recognition motion is ready;

an eighth step of determining, when the recognition motion is ready, that the recognition motion has started when an angular velocity with respect to the pitch axis is above the first reference value;

a ninth step of ending, when the recognition motion is started, recognition and returning to a standby state when the inclination with respect to the roll axis of the recognition motion is out of the second reference range;

a tenth step of ending, when an angular velocity with respect to the pitch axis at a completion time of the recognition motion is below the second reference value, recognition and returning to the standby state;

an eleventh step of determining, when a cumulative value of linear acceleration velocity with respect to the Z-axis from a start time of the recognition motion to a completion time of the recognition motion is below the third reference value, that the recognition motion is invalid to end recognition to return to the standby mode; and a twelfth step of comparing a current rotation amount, which is a value obtained by dividing a maximum angular velocity with respect to the roll axis from the start time to the completion time of the recognition motion by a maximum angular velocity with respect to the pitch axis, and a current interference amount, which is a value obtained by dividing a maximum angular velocity with respect to the yaw axis from the start time to the completion time of the recognition motion by a maximum angular velocity with respect to the pitch axis, with the reference rotation amount and the reference interference amount previously stored in the memory, respectively, wherein whether the recognition motion matches the reference motion is determined based on the comparison result, and wherein the completion time of the recognition motion is determined as a time when a current angular velocity value with respect to the pitch axis becomes below a reference ratio of the maximum angular velocity with respect to the pitch axis after the start time of the recording motion.

7. A method for outputting a control signal based on a user's up move motion in an electronic device, the method comprising:

acquiring acceleration values for an X-axis in a left-right direction, a Y-axis in an up-down direction, and a Z-axis in a front-rear direction, respectively, based on acceleration data received from an accelerometer of the electronic device;

acquiring angular velocity values for a yaw axis, a pitch axis, and a roll axis, respectively, based on gyro data received from a gyroscope of the electronic device;

acquiring inclination values for a yaw axis, a pitch axis, and a roll axis, respectively, based on acceleration data, gyro data, and geomagnetic data acquired from the accelerometer, the gyroscope, and the magnetometer of the electronic device, respectively;

generating, when a current operation mode is a gesture recording mode, the user' gesture profile corresponding to a reference motion by making a recording motion in which the user makes the reference motion at least once; and determining, when the current operation mode is a gesture recognition mode, whether the user's recognition motion matches the reference motion, wherein the reference motion is an up move, wherein the generating of the user's gesture profile comprises:

a first step of determining, when an inclination with respect to the roll axis of the electronic device is within a first reference range, that the recording motion is ready;

a second step of determining, when the recording motion is ready, that the recording motion has started when an angular velocity with respect to the yaw axis is above a first reference value;

a third step of ending, when the recording motion is started, the generation of the gesture profile and returning to a standby state when the inclination with respect to the roll axis of the recording motion is out of a second reference range;

a fourth step of ending, when an angular velocity with respect to the yaw axis at a completion time of the recording motion is below a second reference value, the generation of the gesture profile and returning to the standby state;

a fifth step of determining, when a cumulative value of linear acceleration velocity with respect to the X-axis from a start time to a completion time of the recording motion is below a third reference value, that the recording motion is invalid to end the generation of the gesture profile to return to the standby mode; and a sixth step of storing a reference rotation amount, which is a value obtained by dividing a maximum angular velocity with respect to the roll axis from the start time to the completion time of the recording motion by a maximum angular velocity with respect to the yaw axis, and a reference interference amount, which is a value obtained by dividing a maximum angular velocity with respect to the pitch axis from the start time to the completion time of the recording motion by a maximum angular velocity with respect to the yaw axis, in a memory as the user's characteristic values, and wherein the completion time of the recording motion is determined as a time when a current angular velocity value with respect to the yaw axis becomes below a reference ratio of the maximum angular velocity with respect to the yaw axis after the start time of the recording motion.

8. The method of claim 7, wherein the user's gesture profile is generated by the user making the recording motion a number of times, wherein each number is counted only when all operations from the first step to the sixth step are completed, wherein the reference rotation amount is determined based on reference rotation amounts acquired over a number of times, respectively, and wherein the reference interference amount is determined based on reference interference amounts acquired over a number of times, respectively.

9. The method of claim 7, wherein the determining of whether the user's recognition motion matches the reference motion comprises:

a seventh step of determining, when an inclination with respect to the roll axis of the electronic device is within the first reference range, that the recognition motion is ready;

an eighth step of determining, when the recognition motion is ready, that the recognition motion has started when an angular velocity with respect to the yaw axis is above the first reference value;

a ninth step of ending, when the recognition motion is started, recognition and returning to a standby state when the inclination with respect to the roll axis of the recording motion is out of the second reference range;

a tenth step of ending, when an angular velocity with respect to the yaw axis at a completion time of the recognition motion is below the second reference value, recognition and returning to the standby state;

an eleventh step of determining, when a cumulative value of linear acceleration velocity with respect to the X-axis from a start time to a completion time of the recognition motion is below the third reference value, that the recognition motion is invalid to end recognition to return to the standby mode; and a twelfth step of comparing a current rotation amount, which is a value obtained by dividing a maximum angular velocity with respect to the roll axis from the start time to the completion time of the recognition motion by a maximum angular velocity with respect to the yaw axis, and a current interference amount, which is a value obtained by dividing a maximum angular velocity with respect to the pitch axis from the start time to the completion time of the recognition motion by a maximum angular velocity with respect to the yaw axis, with the reference rotation amount and the reference interference amount previously stored in the memory, respectively, wherein whether the recognition motion matches the reference motion is determined based on the comparison result, and wherein the completion time of the recognition motion is determined as a time when a current angular velocity value with respect to the yaw axis becomes below a reference ratio of the maximum angular velocity with respect to the yaw axis after the start time of the recognition motion.

10. A method for outputting a control signal based on a user's down move motion in an electronic device, the method comprising:

acquiring acceleration values for an X-axis in a left-right direction, a Y-axis in an up-down direction, and a Z-axis in a front-rear direction, respectively, based on acceleration data received from an accelerometer of the electronic device;

acquiring angular velocity values for a yaw axis, a pitch axis, and a roll axis, respectively, based on gyro data received from a gyroscope of the electronic device;

acquiring inclination values for a yaw axis, a pitch axis, and a roll axis, respectively, based on acceleration data, gyro data, and geomagnetic data acquired from the accelerometer, the gyroscope, and the magnetometer of the electronic device, respectively;

generating, when a current operation mode is a gesture recording mode, the user' gesture profile corresponding to a reference motion by making a recording motion in which the user makes the reference motion at least once; and determining, when the current operation mode is a gesture recognition mode, whether the user's recognition motion matches the reference motion, wherein the reference motion is a down move, wherein the generating of the user's gesture profile comprises:

a first step of determining, when an inclination with respect to the roll axis of the electronic device is within a first reference range, that the recording motion is ready;

a second step of determining, when the recording motion is ready, that the recording motion has started when an angular velocity with respect to the yaw axis is above a first reference value;

a third step of ending, when the recording motion is started, the generation of the gesture profile and returning to a standby state when the inclination with respect to the roll axis of the recording motion is out of a second reference range or an absolute value of the inclination with respect to the pitch axis is above a second reference value, and the inclination with respect to the roll axis is below a third reference value;

a fourth step of ending, when an angular velocity with respect to the yaw axis at a completion time of the recording motion is below a fourth reference value, the generation of the gesture profile and returning to the standby state;

a fifth step of determining, when a cumulative value of linear acceleration velocity with respect to the X-axis from a start time to a completion time of the recording motion is below a fifth reference value, that the recording motion is invalid to end the generation of the gesture profile to return to the standby mode; and a sixth step of storing a reference rotation amount, which is a value obtained by dividing a maximum angular velocity with respect to the roll axis from the start time to the completion time of the recording motion by a maximum angular velocity with respect to the yaw axis, and a reference interference amount, which is a value obtained by dividing a maximum angular velocity with respect to the pitch axis from the start time to the completion time of the recording motion by a maximum angular velocity with respect to the yaw axis, in a memory as the user's characteristic values, and wherein the completion time of the recording motion is determined as a time when a current angular velocity value with respect to the yaw axis becomes below a reference ratio of the maximum angular velocity with respect to the yaw axis after the start time of the recording motion.

11. The method of claim 10, wherein the user's gesture profile is generated by the user making the recording motion a number of times, wherein each number is counted only when all operations from the first step to the sixth step are completed, wherein the reference rotation amount is determined based on reference rotation amounts acquired over a number of times, respectively, and wherein the reference interference amount is determined based on reference interference amounts acquired over a number of times, respectively.

12. The method of claim 10, wherein the determining of whether the user's recognition motion matches the reference motion comprises:

a seventh step of determining, when an inclination with respect to the roll axis of the electronic device is within the first reference range, that the recognition motion is ready;

an eighth step of determining, when the recognition motion is ready, that the recognition motion has started when an angular velocity with respect to the yaw axis is above the first reference value;

a ninth step of ending, when the recognition motion is started, recognition and returning to a standby state when the inclination with respect to the roll axis of the recording motion is out of the second reference range or an absolute value of the inclination with respect to the pitch axis is above a second reference value, and the inclination with respect to the roll axis is below a third reference value;

a tenth step of ending, when an angular velocity with respect to the yaw axis at a completion time of the recognition motion is below the fourth reference value, recognition and returning to the standby state;

an eleventh step of determining, when a cumulative value of linear acceleration velocity with respect to the X-axis from a start time to a completion time of the recognition motion is below the fifth reference value, that the recognition motion is invalid to end recognition to return to the standby mode; and a twelfth step of comparing a current rotation amount, which is a value obtained by dividing a maximum angular velocity with respect to the roll axis from the start time to the completion time of the recognition motion by a maximum angular velocity with respect to the yaw axis, and a current interference amount, which is a value obtained by dividing a maximum angular velocity with respect to the pitch axis from the start time to the completion time of the recognition motion by a maximum angular velocity with respect to the yaw axis, with the reference rotation amount and the reference interference amount previously stored in the memory, respectively, wherein whether the recognition motion matches the reference motion is determined based on the comparison result, and wherein the completion time of the recognition motion is determined as a time when a current angular velocity value with respect to the yaw axis becomes below a reference ratio of the maximum angular velocity with respect to the yaw axis after the start time of the recognition motion.

13. An electronic device for outputting a control signal based on a user's motion, the electronic device comprising:

an accelerometer;

a gyroscope;

a magnetometer;

a first processor that acquires acceleration values for an X-axis in a left-right direction, a Y-axis in an up-down direction, and a Z-axis in a front-rear direction, respectively, based on acceleration data received from the accelerometer, acquires angular velocity values for a yaw axis, a pitch axis, and a roll axis, respectively, based on gyro data received from the gyroscope of the electronic device, and acquires inclination values for a yaw axis, a pitch axis, and a roll axis, respectively, based on acceleration data, gyro data, and geomagnetic data acquired from the accelerometer, the gyroscope, and the magnetometer of the electronic device, respectively;

a second processor that acquires, at periodic intervals from the first processor, acceleration values for the X-axis in a left-right direction, the Y-axis in an up-down direction, and the Z-axis in a front-rear direction, respectively, angular velocity values for the yaw axis, the pitch axis, and the roll axis, respectively, and inclination values for the yaw axis, the pitch axis, and the roll axis, respectively; and a memory for storing a reference rotation amount and a reference interference amount for the user's recording motion as the user's characteristic values, wherein when a current operation mode is a gesture recording mode, a reference rotation amount and a reference interference amount are acquired from motion data acquired from the recording motion made by the user and stored in the memory, wherein when the current operation mode is a gesture recognition mode, a rotation amount and an interference amount acquired from a recognition motion made by the user are compared with the reference rotation amount and the reference interference amount, respectively, wherein the recording motion comprises a left, right, up, or down move motion, wherein the user's characteristic values comprise a first reference rotation amount and a first reference interference amount for the user's left move motion, a second reference rotation amount and a second reference interference amount for the user's right move motion, a third reference rotation amount and a third reference interference amount for the user's up move motion, and a fourth reference rotation amount and a fourth reference interference amount for the user's down move motion, and wherein when the recording motion is a left, up, or down move motion, the reference rotation amount is a value obtained by dividing a maximum angular velocity with respect to the roll axis by a maximum angular velocity with respect to the yaw axis from a start time to a completion time of the recording motion, and the reference interference amount is a value obtained by dividing a maximum angular velocity with respect to the pitch axis by a maximum angular velocity with respect to the yaw axis from the start time to the completion time of the recording motion, and when the recording motion is a right move motion, the reference rotation amount is a value obtained by dividing a maximum angular velocity with respect to the roll axis by a maximum angular velocity with respect to the pitch axis from the start time to the completion time of the recording motion, and the reference interference amount is a value obtained by dividing a maximum angular velocity with respect to the yaw axis by a maximum angular velocity with respect to the pitch axis from the start time to the completion time of the recording motion.

* * * * *